(12) United States Patent
Park et al.

(10) Patent No.: US 8,040,952 B2
(45) Date of Patent: Oct. 18, 2011

(54) SCALABLE MULTI-VIEW IMAGE ENCODING AND DECODING APPARATUSES AND METHODS

(75) Inventors: Gwang-Hoon Park, Gyeonggi-do (KR); Won-jun Choi, Busan (KR)

(73) Assignees: Samsung Electronics, Co., Ltd., Suwon-si (KR); Industry Academic Cooperation Foundation Kyunghee University, Youngin-si (KR)

( * ) Notice: Subject to any disclaimer, the term of this patent is extended or adjusted under 35 U.S.C. 154(b) by 1602 days.

(21) Appl. No.: 11/392,817

(22) Filed: Mar. 30, 2006

(65) Prior Publication Data

US 2006/0222079 A1 Oct. 5, 2006

(30) Foreign Application Priority Data

Apr. 1, 2005 (KR) .................. 10-2005-0027729
Mar. 21, 2006 (KR) .................. 10-2006-0025680

(51) Int. Cl.
  *H04N 11/02* (2006.01)
(52) U.S. Cl. .............. 375/240.16; 375/240.01
(58) Field of Classification Search .......... 375/240.01, 375/240.16
  See application file for complete search history.

(56) References Cited

U.S. PATENT DOCUMENTS

| | | | |
|---|---|---|---|
| 5,619,256 A | 4/1997 | Haskell et al. | |
| 6,057,884 A | 5/2000 | Chen et al. | |
| 6,072,831 A | 6/2000 | Chen | |
| 6,381,276 B1 | 4/2002 | Pesquet-Popescu | |
| 6,639,943 B1 | 10/2003 | Radha et al. | |
| 6,925,120 B2 | 8/2005 | Zhang et al. | |
| 6,931,068 B2 | 8/2005 | Picheet et al. | |
| 6,944,225 B2 | 9/2005 | Li | |
| 6,956,972 B2 | 10/2005 | Wu et al. | |
| 7,468,745 B2 * | 12/2008 | Xin et al. .................. | 348/218.1 |
| 2004/0114689 A1 | 6/2004 | Zhang et al. | |
| 2005/0047509 A1 | 3/2005 | Lee et al. | |
| 2005/0078755 A1 | 4/2005 | Woods et al. | |
| 2005/0185712 A1 | 8/2005 | Lee | |
| 2005/0201468 A1 | 9/2005 | Tsai et al. | |
| 2006/0008038 A1 * | 1/2006 | Song et al. .................. | 375/350 |

FOREIGN PATENT DOCUMENTS

| | | |
|---|---|---|
| KR | 1020020026177 A | 4/2002 |
| KR | 1020030088541 A | 11/2003 |
| WO | 2004077834 A1 | 9/2004 |

OTHER PUBLICATIONS

J. Reichel et al., Joint Video Team (JVT) of ISO/IEC MPEG & ITU T VCEG (ICO/IEC/ JTC1/SC29/WG11 and ITU-T SG16 Q.6), Joint Scalable Video Model JSVM 0 Document: N020, 14th Meeting: Hong Kong, CN Jan. 17-21, 2005.

* cited by examiner

*Primary Examiner* — Shuwang Liu
*Assistant Examiner* — Michael Neff
(74) *Attorney, Agent, or Firm* — Roylance, Abrams, Berdo & Goodman, L.L.P.

(57) ABSTRACT

Scalable multi-view image encoding and decoding methods and apparatuses are provided. The scalable multi-view image encoding and decoding methods and apparatuses filter multi-view images input from a plurality of cameras in spatial-axis and in temporal-axis directions using motion compensated temporal filtering (MCTF) or hierarchical B-pictures and scalably code the filtered multi-view.

14 Claims, 29 Drawing Sheets

SCALABLE MULTI-VIEW IMAGE ENCODING AND DECODING APPARATUSES AND METHODS

BACKGROUND OF THE INVENTION

This application claims the benefit under 35 U.S.C. §119 (a) of Korean Patent Applications No. 10-2005-0027729, filed on Apr. 1, 2005, and No. 10-2006-0025680, filed on Mar. 21, 2006 in the Korean Intellectual Property Office, the disclosures of which are hereby incorporated by reference.

1. Field of the Invention

The present invention relates to image encoding and decoding methods and apparatuses. More particularly, the present invention relates to scalable multi-view image encoding and decoding methods and apparatuses which filter multi-view images input from a plurality of cameras in spatial-axis and temporal-axis directions using motion compensated temporal filtering (MCTF) or hierarchical B-pictures and scalably code the filtered multi-view images using a scalable video coding (SVC) technique.

2. Description of the Related Art

Digital broadcasting services are expected to evolve from high-definition television (HDTV) and satellite/ground-wave digital multimedia broadcasting (DMB) services to interactive TV and broadcasting services, to three-dimensional (3D) TV and broadcasting services, and then to reality broadcasting services. Reality broadcasting services provide viewers with information regarding images of scenes at various viewpoints. Reality broadcasting services allow a viewer to select a preferred scene by creatively editing an image of the scene provided by a broadcasting station. To implement such reality broadcasting services, panorama images must be generated. To generate a panorama image, images are acquired using a plurality of cameras placed at various viewpoints. Then, the acquired images are connected. Alternatively, a panorama image may be obtained using an omni-directional camera system. A large amount of data must be collected and transmitted to deliver image information obtained using a plurality of cameras to users. Accordingly, various methods of collecting information regarding multi-view images have been studied. For example, a multi-view camera system, a stereoscopic camera system and an omni-directional camera system, have been studied. A multi-view camera system simultaneously films or transmits a subject or a scene using a plurality (M) of cameras and provides users with various scenes or a three-dimensional (3D) scene provided by the M cameras at different locations.

Multi-view image coding relates to simultaneously coding images input from M cameras that provide multi-view images. Multi-view image coding also relates to compressing, storing, and transmitting the coded images. When a multi-view image is stored and transmitted without being compressed, a large transmission bandwidth is required to transmit the data to users in real time through a broadcasting network or wired/wireless Internet due to the large volume of data of the multi-view image. For example, when 24-bit color images, each with a resolution of 1310×1030 pixels, are input from 16 cameras at a rate of 30 frames/sec, 14.4 Gb/sec data must be processed. Therefore, a 3D audio and video subgroup in the Motion Picture Experts Group (MPEG) has organized a group dedicated to devising a multi-view coding method. The group attempts to make a method of coding a huge amount of image data input from a multi-view video using an international standard for video compression.

FIGS. 1A through 1C illustrate arrangements of conventional multi-view cameras. FIG. 2 illustrates images respectively and simultaneously input to 16 multi-view cameras arranged in a 4×4 parallel structure in a free-viewpoint TV (FTV) system. FIGS. 1A through 1C illustrate a plurality of cameras 10 arranged in a parallel structure, a convergent structure, and a divergent structure, respectively.

Referring to FIG. 2, the images respectively input to the 16 cameras are very similar. In other words, a high correlation exists between the images input to the cameras that provide a multi-view image. Therefore, information regarding the high spatial correlation between the images input to the cameras can be utilized to achieve high compression efficiency in multi-view video coding. Also, spatio-temporal scalable coding is required to present 3D or 2D images in various environments and using terminals with diverse computational capabilities.

Accordingly, there is a need for improved apparatuses and methods to filter multi-view images input from multiple cameras in the spatial-axis and temporal-axis directions to support a variety of spatio-temporal scalabilities.

SUMMARY OF THE INVENTION

An aspect of exemplary embodiments of the present invention is to address at least the above problems and/or disadvantages and to provide at least the advantages described below.

Accordingly, an aspect of exemplary embodiments of the present invention provides a scalable multi-view image encoding method and apparatus which spatially and temporally filters multi-view images input from a plurality of cameras for a predetermined period of time, thereby supporting various spatio-temporal scalabilities. For example, an exemplary embodiment of the present invention provides a scalable multi-view image encoding method and apparatus for filtering a 2D group of pictures (GOP), which is a combination of a plurality of images acquired in temporal-axis and spatial-axis directions, using motion compensated temporal filtering (MCTF) or hierarchical B-pictures in the spatial-axis and temporal-axis directions and scalably coding the filtered 2D GOP using a scalable video coding (SVC) technique.

An exemplary embodiment of the present invention also provides a scalable multi-view image decoding method and apparatus which decodes a bitstream for multi-view images scalably encoded, thereby supporting spatio-temporal scalability.

According to an aspect of an exemplary embodiment of the present invention, a scalable multi-view image encoding method is provided. M images are input from M cameras and are filtered on a spatial axis. The M images are filtered by using spatial motion compensated temporal filtering (MCTF) or hierarchical B-pictures. A spatial low-frequency image and (M−1) spatial high-frequency images are generated. N spatial low-frequency images generated for an N period of time are filtered using temporal MCTF or the hierarchical B-pictures. A temporal low-frequency image and (N−1) temporal high-frequency images are generated. The temporal low-frequency image and the (N−1) temporal high-frequency images are scalable encoded according to a transmission bit rate allocated to each group of M×N two-dimensional (2D) images. Also, the (M−1) spatial high-frequency images are scalably encoded with reference to a transmission bit rate allocated to the temporal low-frequency image and the (N−1) temporal high-frequency images.

According to another aspect of an exemplary embodiment of the present invention, a scalable multi-view image encoding apparatus is provided. A spatial image filtering unit filters M images on a spatial axis, which are input from M cameras.

The M images are filtered by using spatial MCTF or hierarchical B-pictures and a spatial low-frequency image and (M−1) spatial high-frequency images are generated. A temporal image filtering unit filters N spatial low-frequency images generated for an N period of time by using temporal MCTF or the hierarchical B-pictures and a temporal low-frequency image and (N−1) temporal high-frequency images are generated. A temporal image scalable encoding unit scalably encodes the temporal low-frequency image and the (N−1) temporal high-frequency images according to a transmission bit rate allocated to each group of M×N two-dimensional (2D) images. A spatial image scalable encoding unit scalably encodes the (M−1) spatial high-frequency images according to a transmission bit rate allocated to the temporal low-frequency image and the (N−1) temporal high-frequency images.

According to still another aspect of an exemplary embodiment of the present invention, a scalable multi-view image decoding method is provided. A scalably encoded bitstream is received corresponding to spatio-temporal low-frequency and high-frequency images generated after a group of 2D images input from M cameras for an N period of time are spatially and temporally filtered using MCTF or hierarchical B-pictures. The scalably encoded temporal low-frequency and high-frequency images included in the bitstream are decoded. The decoded temporal low-frequency and high-frequency images are inversely filtered by using temporal inverse-MCTF or the hierarchical B-pictures and the spatial low-frequency images are reconstructed. The scalably encoded spatial high-frequency images included in the bitstream are decoded, the reconstructed spatial low-frequency images and the decoded spatial high-frequency images are inversely filtered by using the temporal inverse-MCTF or the hierarchical M-pictures, and images are reconstructed.

According to a further aspect of an exemplary embodiment of the present invention, a scalable multi-view image decoding apparatus is provided. A temporal image decoding unit receives a scalably encoded bitstream corresponding to spatio-temporal low-frequency and high-frequency images generated after a group of 2D images input from M cameras for an N period of time are temporally and spatially filtered using MCTF or hierarchical B-pictures. The scalably encoded temporal low-frequency and high-frequency images included in the bitstream are decoded. A temporal inverse-filtering unit inversely filters the decoded temporal low-frequency and high-frequency images using temporal inverse-MCTF or the hierarchical B-pictures and reconstructs the spatial low-frequency images. A spatial image decoding unit decodes the scalably encoded spatial high-frequency images included in the bitstream, a spatial inverse-filtering unit inversely filters the reconstructed spatial low-frequency images and the decoded spatial high-frequency images using the temporal inverse-MCTF or the hierarchical M-pictures and reconstructs images.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent by describing in detail exemplary embodiments thereof with reference to the attached drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions are constructions are omitted for clarity and conciseness. Scalable image encoding and hierarchical B-pictures, which are applied to exemplary embodiments of the present invention, will now be described to facilitate an understanding of the present invention.

Scalable image encoding relates to converting image information with various resolutions, frame rates and visual qualities into one bitstream and providing the bitstream according to various environments and terminals with various processing capabilities.

Figure 1A:
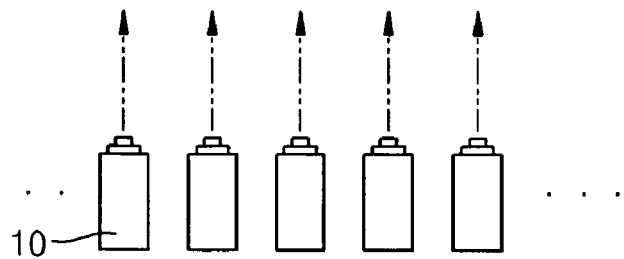
FIGS. 1A through 1C illustrate arrangements of conventional multi-view cameras.
Figure 1B:
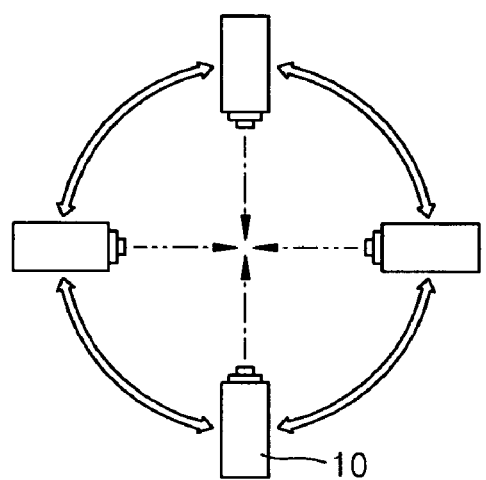
Figure 1C:
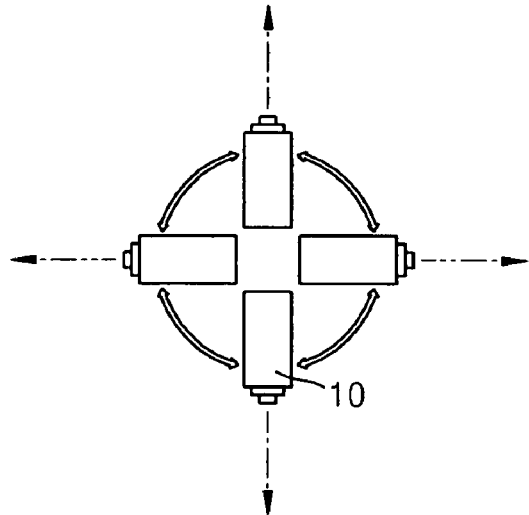
Figure 2:
FIG. 2 illustrates images respectively and simultaneously input to 16 multi-view cameras arranged in a 4×4 parallel structure in a free-viewpoint TV (FTV) system.
Figure 3:
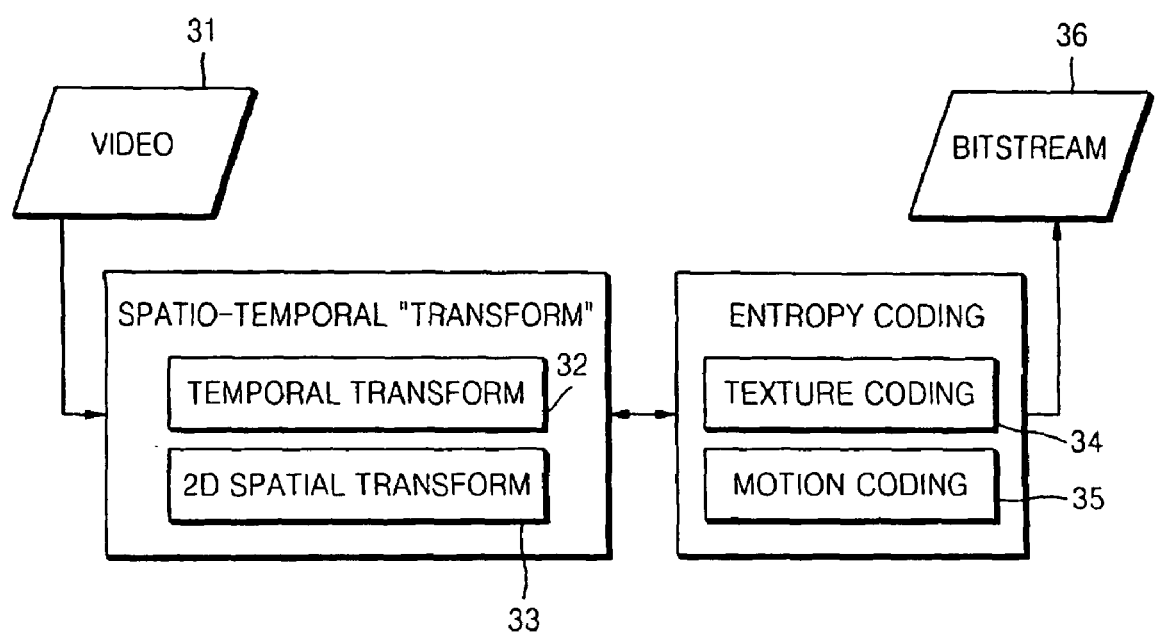
FIG. 3 is a conceptual block diagram for illustrating the concept of scalable image encoding according to an exemplary embodiment of the present invention.
Figure 4:
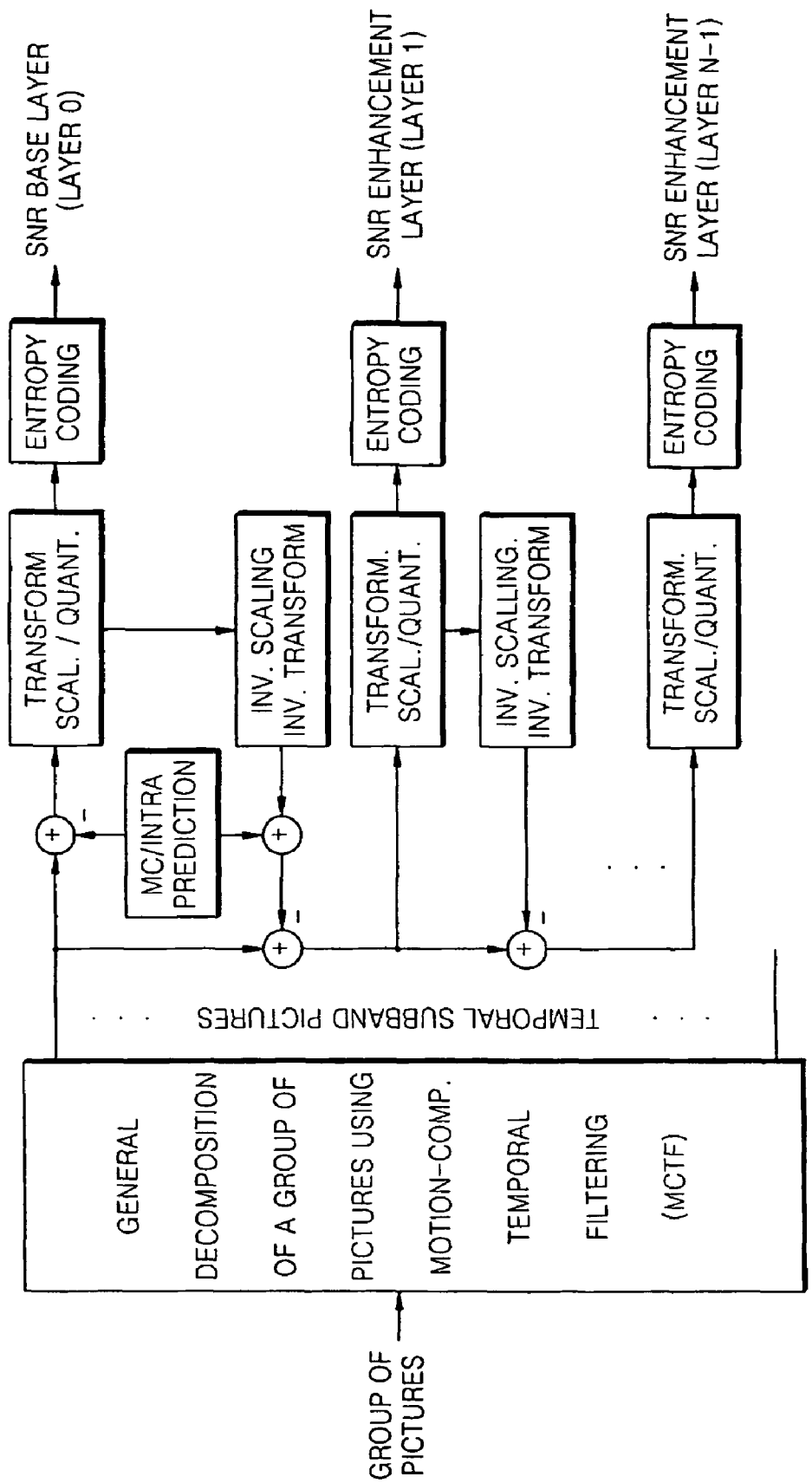
FIG. 4 is a block diagram of a scalable image encoding apparatus according to an exemplary embodiment of the present invention.

FIG. 3 is a conceptual diagram for illustrating the concept of scalable image encoding. FIG. 4 is a conceptual block diagram of a scalable image encoding apparatus. FIGS. 3 and 4 illustrate scalable image encoding in which an input video 31 is temporally scaled using a temporal transform 32 and spatially scaled using a 2D spatial transform 33. Also, the input video 31 is qualitatively scaled using texture coding 34. Motion coding 35 scalably encodes motion information obtained when spatial scalability is implemented. Consequently, a bitstream 36 is generated.

In scalable image encoding, motion compensated temporal filtering (MCTF) and the hierarchical B-pictures are used to provide temporal scalability and enhance compression efficiency.

The MCTF relates to performing a wavelet transform using information regarding motions in a temporal-axis direction in an image sequence. The wavelet transform is performed using a lifting scheme. The lifting scheme is used to efficiently perform the wavelet transform. The lifting scheme guarantees a fully reconstructed image if quantization is not performed. The lifting scheme includes a polyphase decomposition operation, a prediction operation, and an update operation.

Figure 5:
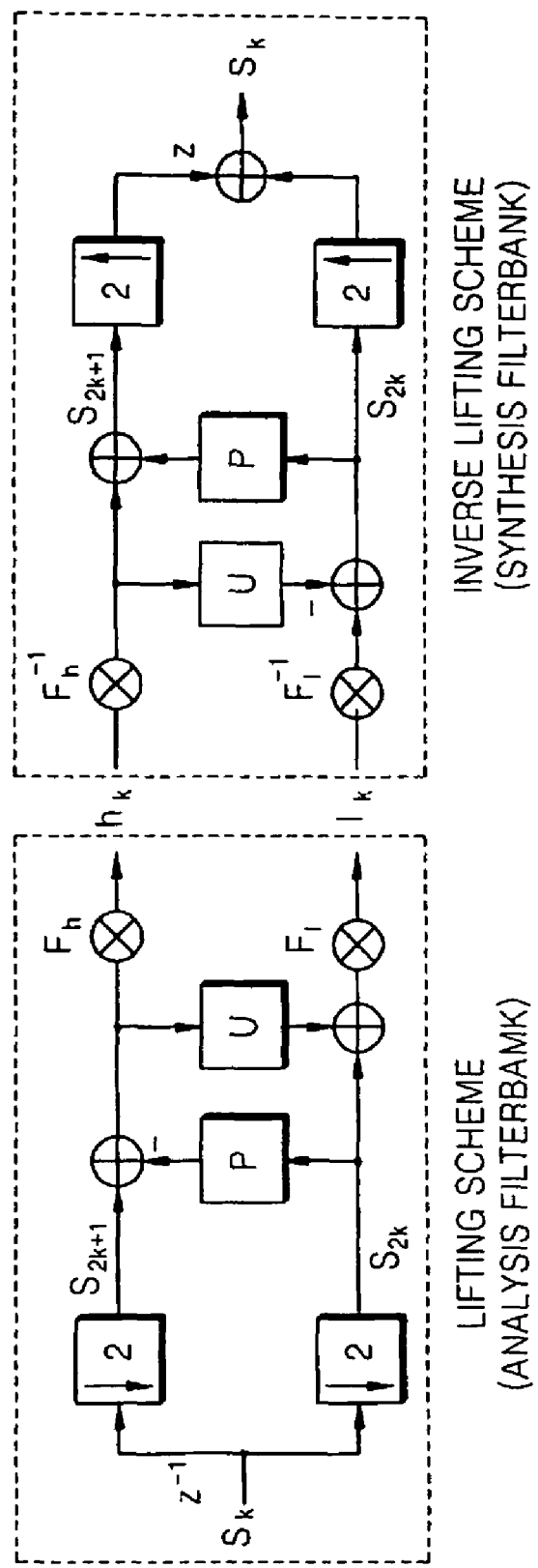
FIG. 5 is a conceptual diagram for illustrating operations performed in a lifting scheme used in motion compensated temporal filtering (MCTF) according to an exemplary embodiment of the present invention.

FIG. 5 is a conceptual diagram for illustrating the operations performed in the lifting scheme used in the MCTF. In this description, portions of equations represented in square brackets are shown as subscripts in the figures. Referring to FIG. 5, an input signal s[k] is divided into an even-numbered signal s[2k] and an odd-numbered signal s[2k+1]. A prediction operator P (s[2k+1]) comprised of an initial combination of even-numbered signals s2k is subtracted from the odd-numbered signal s[2k+1] to obtain a high-frequency signal h[k]. An update operator U (s[2k]) comprised of an initial combination of high-frequency signals h[k] is added to the even-numbered signal s[2k] to obtain a low-frequency signal l[k]. This process is defined by $$h[k] = s[2k+1] - P(s[2k]) \text{ with} \qquad (1)$$
$$P(s[2k]) = \sum_i p_i s[2(k+i)]$$
$$l[k] = s[2k] + U(h[k]) \text{ with}$$
$$U(h[k]) = \sum_i u_i h[k+i],$$

In FIG. 5, reference characters $F_l$ and $F_h$ indicate a low-frequency signal and a high-frequency signal, respectively. In an inverse lifting scheme, a fully reconstructed signal can be obtained when the update operation and the prediction operation are performed on the inversely scaled high-frequency signal h[k] and the inversely scaled low-frequency signal l[k]. A lifting scheme using a Haar wavelet is defined by $$h[k] = s[2k+1] - P_{Haar}(s[2k+1]) \qquad (2)$$
$$= s[2k+1] - s[2k]$$
$$l[k] = s[2k] + U_{Haar}(s[2k])$$
$$= s[2k] + \frac{1}{2}h[k],$$

In this case, the high-frequency signal h[k] is obtained after the prediction operation is performed on the odd-numbered signal s[2k+1], that is, after the even-numbered signal s[2k] is subtracted from the odd-numbered signal s[2k+1]. Also, the low-frequency signal l[k] is obtained after the update operation is performed on the even-numbered signal s[2k], that is, after half the high-frequency signal h[k] is added to the even-numbered signal s[2k]. Equation 3 defines the inverse lifting scheme as follows.

$$s[2k] = l[k] - U_{Haar}(h[k]) \qquad (3)$$
$$= l[k] - \frac{1}{2}h[k]$$
$$= s[2k] + \frac{1}{2}h[k] - \frac{1}{2}h[k]$$
$$= s[2k]$$
$$s[2k+1] = h[k] + s[2k]$$
$$= s[2k+1] - s[2k] + s[2k]$$
$$= s[2k+1],$$

In this case, the even-numbered signal s[2k] is obtained after the update operation is performed on the low-frequency signal l[k], that is, after half the high-frequency signal h[k] is subtracted from the low-frequency signal l[k]. Also, the odd-numbered signal s[2k+1] is obtained after the prediction operation is performed on the high-frequency signal h[k], that is, after the reconfigured even-numbered signal s[2k] is added to the high-frequency signal h[k]. After these processes in the lifting scheme are performed, a fully reconstructed image can be obtained.

When it is assumed that a image signal s[x, k] may have a spatial coordinate $x=(x, y)^T$ and a temporal coordinate k to configure temporally, the prediction operation and the update operation using the Harr wavelet are defined by $$P_{Haar}(s[x, 2k+1]) = s[x, 2k] \quad (4)$$

$$U_{Haar}(s[x, 2k]) = \frac{1}{2}h[x, k],$$

Figure 6:
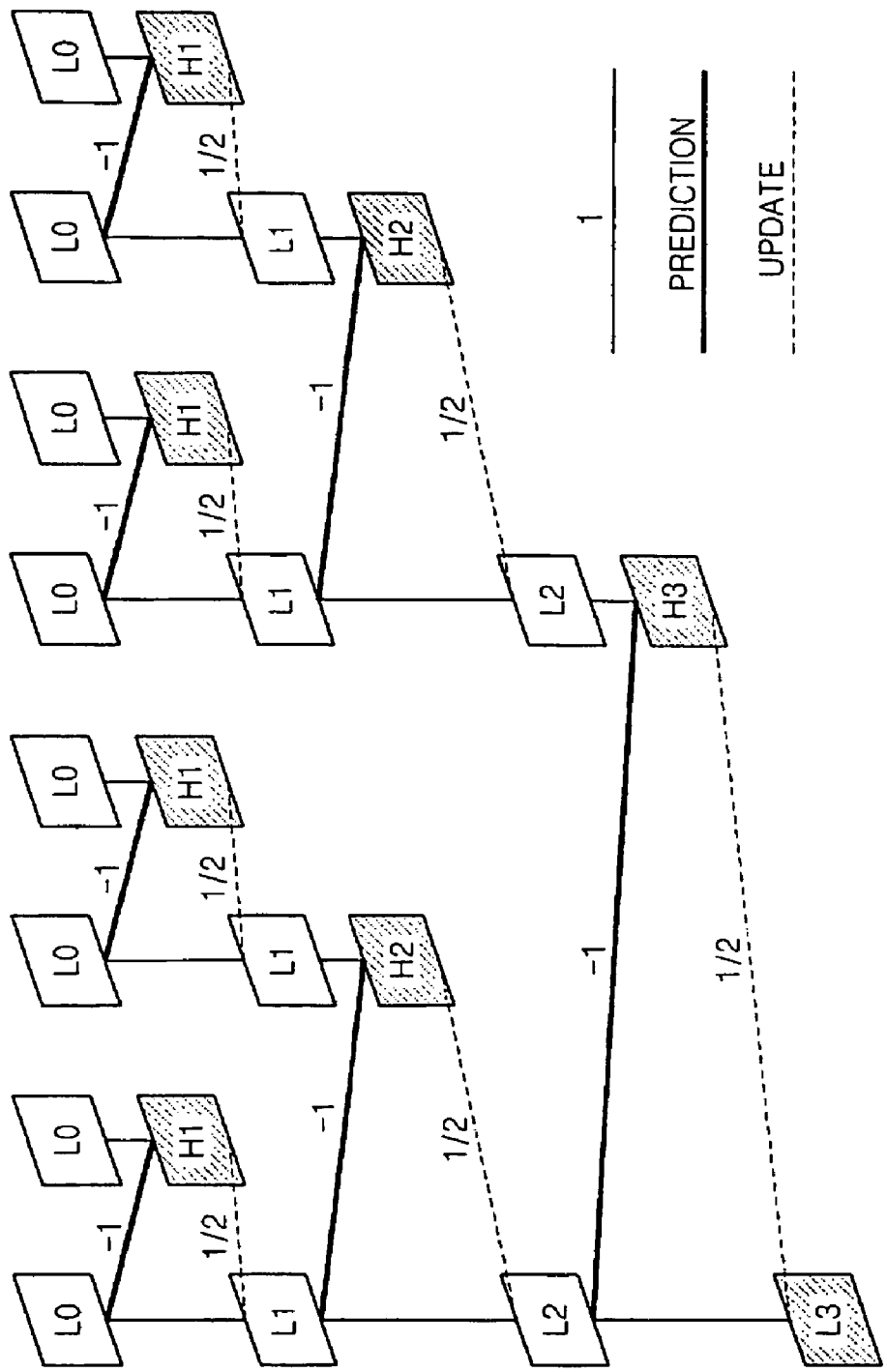
FIG. 6 is a conceptual diagram for illustrating a method of temporally filtering an image sequence, which may have 8 pictures in a group of pictures (GOP), using a Harr wavelet according to an exemplary embodiment of the present invention.

FIG. 6 is a conceptual diagram for illustrating a method of temporally filtering an image sequence, which may have 8 pictures in a group of pictures (GOP), using the Harr wavelet. Referring to FIG. 6, L0 indicates a sequence of original images, and H1 indicates a residual image obtained after a first L0 image is subtracted from a second L0 image (prediction operation). L1 indicates an image obtained by adding images obtained after the first L0 image is added to the H1 residual image multiplied by ½ (update operation). These operations are applied to an L1 image to generate an H2 residual image and an L2 image. The operations are also applied to the L2 image to generate an H3 residual image and an L4 image. The generated images, which are arranged in the order of L3, H3, H2, H2, H1, H1, H1 and H1, are encoded and then transmitted to a decoding end.

Prediction and update operations using a ⅝ spline wavelet are defined by $$P_{5/3}(s[x, 2k+1]) = \frac{1}{2}(s[x, 2k] + s[x, 2k+2]) \quad (5)$$

$$U_{5/3}(s[x, 2k]) = \frac{1}{4}(h[x, k] + h[x, k-1]),$$

Figure 7:
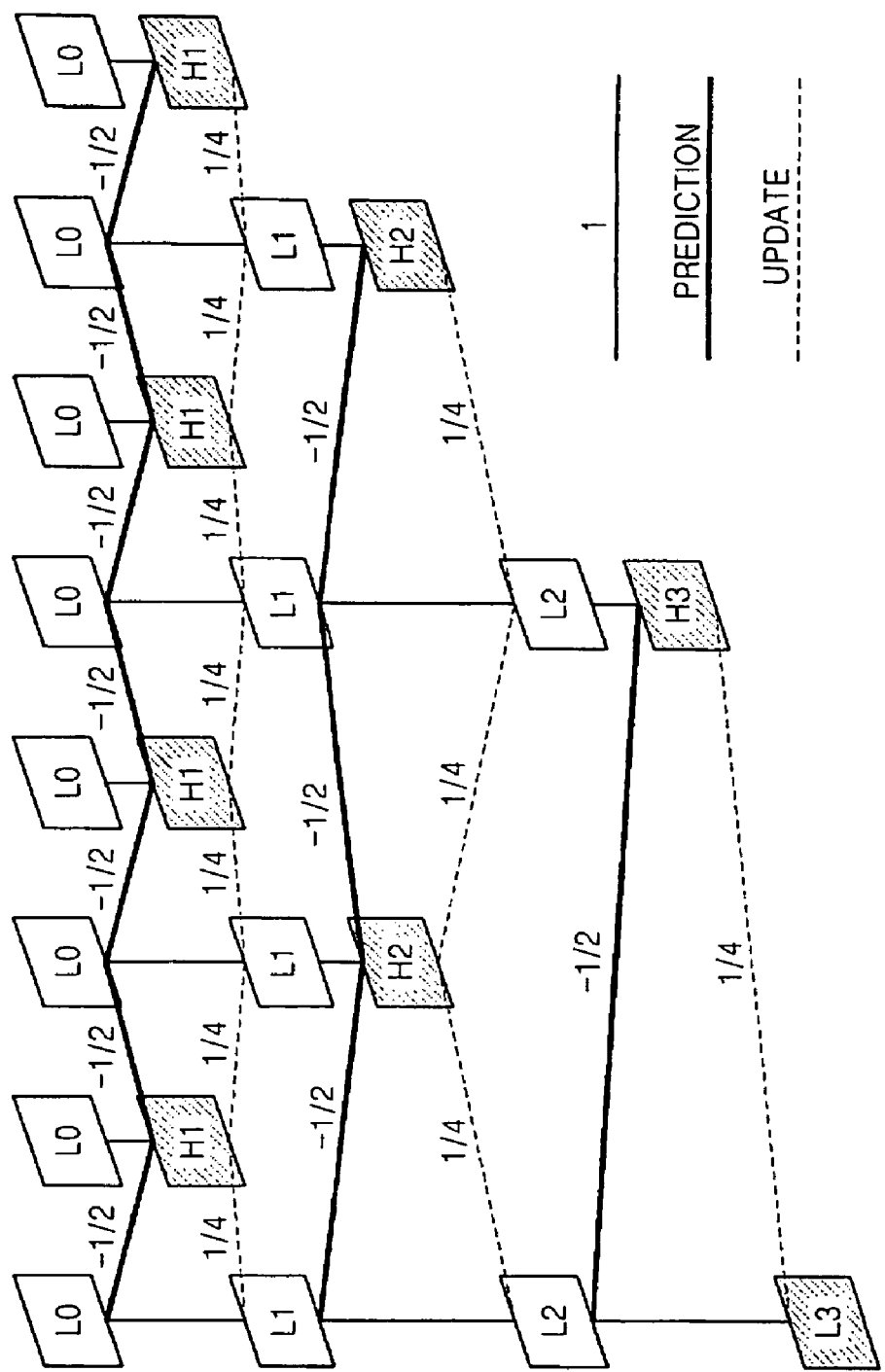
FIG. 7 is a conceptual diagram for illustrating a method of temporally filtering an image sequence, which may have 8 pictures in a GOP, using a 5/3 spline wavelet according to an exemplary embodiment of the present invention.

FIG. 7 is a conceptual diagram for illustrating a method of temporally filtering an image sequence, which may have 8 pictures in a GOP, using the ⅝ spline wavelet. Referring to FIG. 7, L0 indicates a sequence of original images, and H1 indicates a residual image obtained by subtracting images from the even-numbered L0 image. The subtracted images are obtained after odd-numbered L0 images on both sides of an even-numbered L0 image are respectively multiplied by ½. L1 indicates an image obtained by adding images, which are obtained after H1 residual images on both sides of an odd-numbered L0 image are respectively multiplied by ¼, to the odd-numbered L0 image. The generated images, which are arranged in the order of L3, H3, H2, H2, H1, H1, H1 and H1, are encoded and then transmitted to the decoding end.

If the prediction and update operations included in the lifting scheme are performed in a motion direction, they are identical to the MTCF. When a multiple-reference of AVC (Advanced Video Coding) is used, prediction and update operations using a Harr filter and the ⅝ spline wavelet are defined as $$P_{Haar} = (s[x, 2k+1]) = s[x + m_{P0}, 2k - 2r_{P0}] \quad (6)$$

$$U_{Haar}(s[x, 2k]) = \frac{1}{2}h[x + m_{U0}, k + r_{U0}]$$

$$P_{5/3}(s[x, 2k+1]) = \frac{1}{2}(s[x + m_{P0}, 2k - 2r_{P0}] + s[x + m_{P1}, 2k + 2 + 2r_{P1}])$$

$$U_{5/3}(s[x, 2k]) = \frac{1}{4}(h[x + m_{U0}, k + r_{U0}] + h[x + m_{U1}, k - 1 - r_{U1}]),$$

where m denotes a motion vector, and r (r≧0) denotes an index of a reference image.

Figure 8:
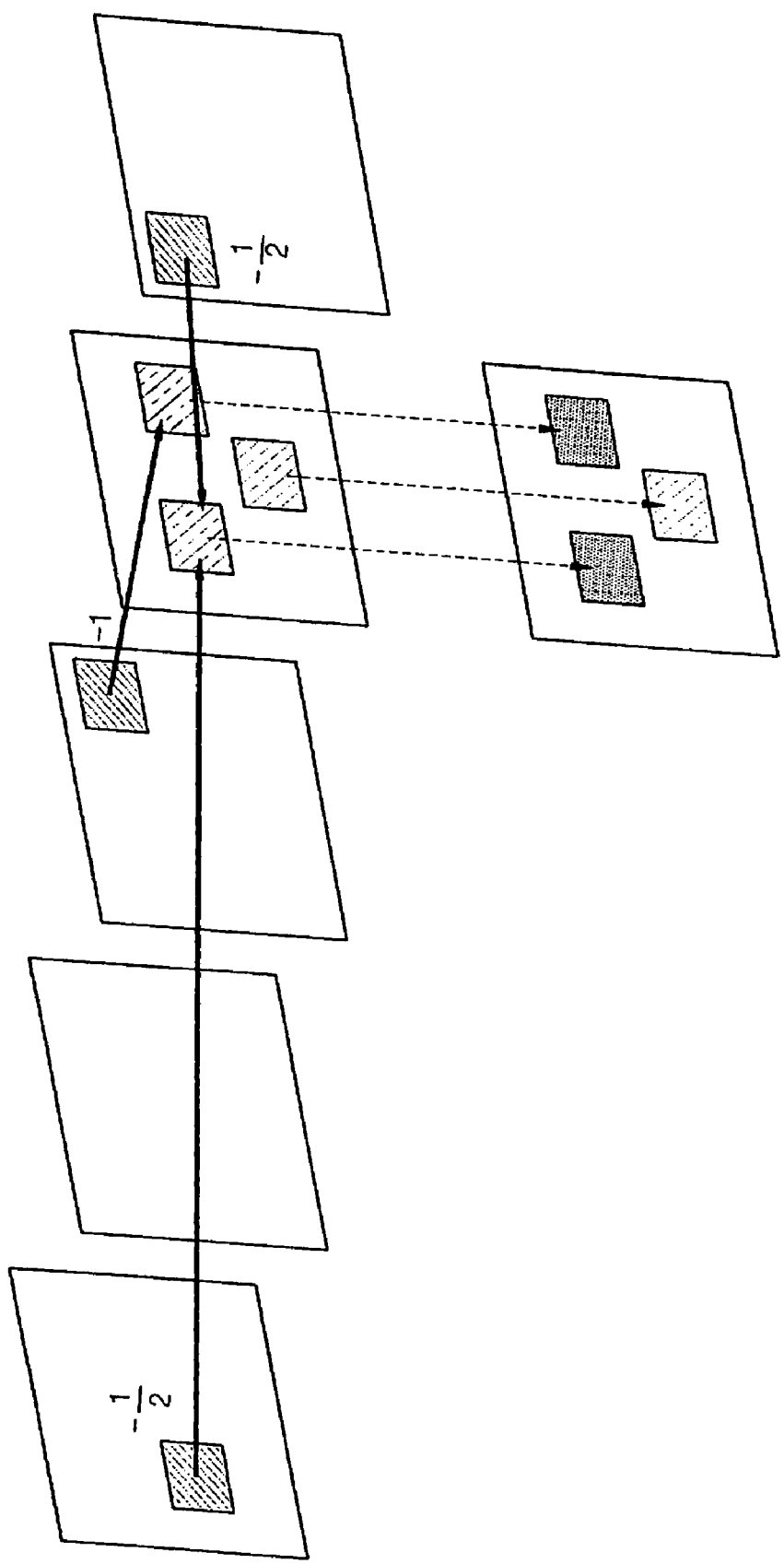
FIG. 8 is a conceptual diagram for illustrating a block-based MTCF prediction operation according to an exemplary embodiment of the present invention.

FIG. 8 is a conceptual diagram for illustrating a block-based MTCF prediction operation. When the prediction of a current block as an intra (I)-block facilitates improvement, the current block is encoded as the I block. When the prediction of a high-frequency block corresponding to a bi-directional current block facilitates improvement, reference blocks respectively multiplied by ½ are subtracted from a current block as in the ⅝ spline wavelet. When the prediction of a high-frequency block corresponding to a current block in one direction facilitates improvement, the reference blocks are subtracted from the current block as in the Harr wavelet. When the reference blocks are not placed next to the current block, but are placed temporally far away from the current block, a multiple-reference is used.

Figure 9:
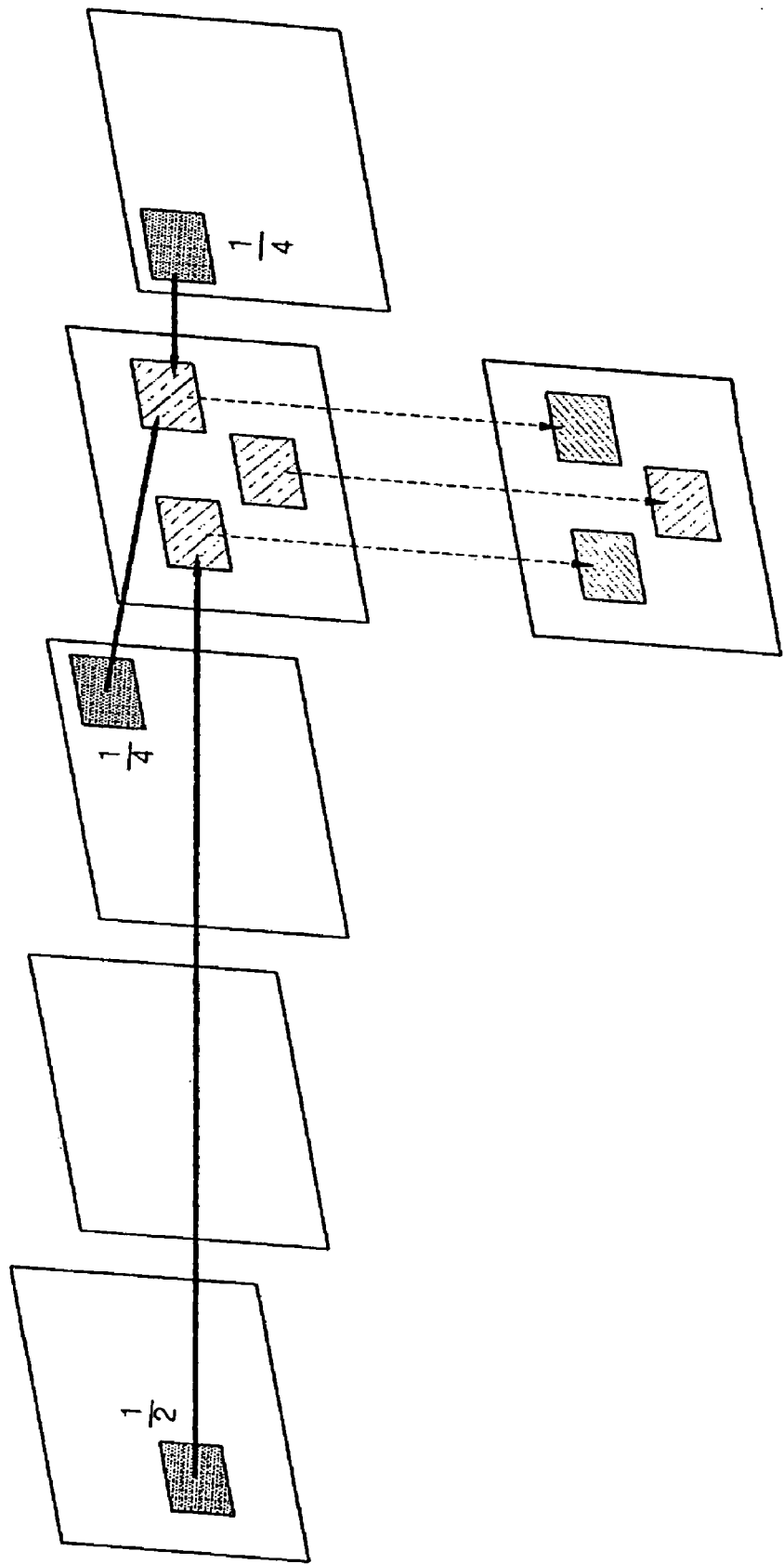
FIG. 9 is a conceptual diagram for illustrating a block-based MCTF update operation according to an exemplary embodiment of the present invention.

FIG. 9 is a conceptual diagram for illustrating a block-based MCTF update operation. When the prediction of a current block as an intra (I)-block facilitates improvement, the current block is encoded as the I block as in the block-based prediction operation described above. When the update of a low-frequency block corresponding to a bi-directional current block facilitates improvement, reference blocks respectively multiplied by ¼ are added to a current block as in the ⅝ spline wavelet. When the prediction of a low-frequency block corresponding to a current block in one direction facilitates improvement, the reference blocks respectively multiplied by ½ are added to the current block as in the Harr wavelet. When the reference blocks are placed far away from the current block, a multiple-reference is used.

In scalable image encoding, scalability can be implemented using two methods. One method uses a bit plane coding technique, and the other method uses a hierarchical technique generally used in a conventional scalable standard. Spatial, temporal, and quality scalabilities can be implemented using the two methods.

Figure 10:
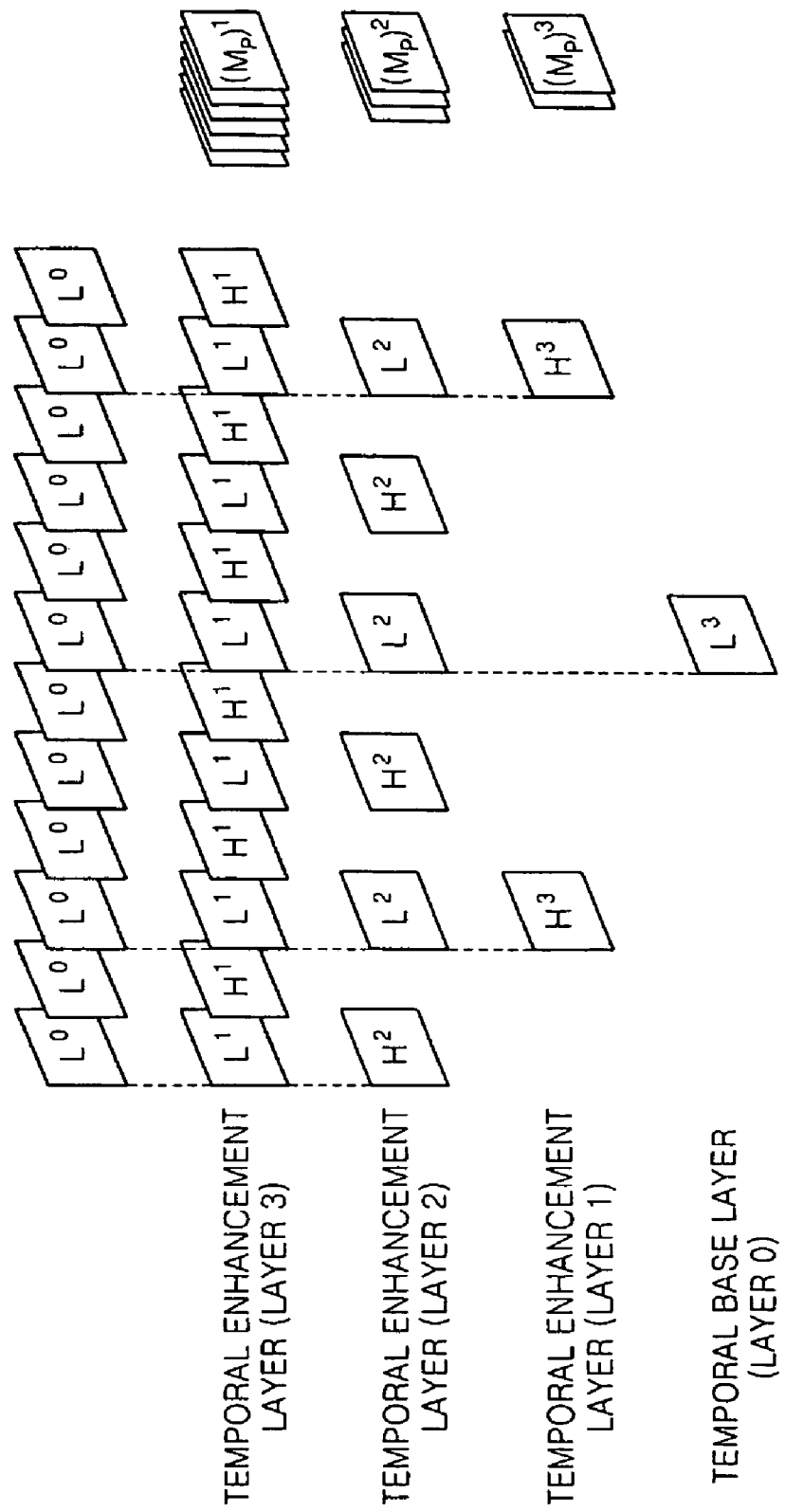
FIG. 10 is a conceptual diagram for illustrating a process of implementing temporal scalability in scalable image encoding according to an exemplary embodiment of the present invention.

FIG. 10 is a conceptual diagram for illustrating a process of implementing temporal scalability in scalable image encoding. To implement temporal scalability, a GOP-based original image sequence is divided into temporal sub-band images using the MCTF, and each sub-band is designated as a layer. Referring to FIG. 10, a low-frequency image L3 generated after the MTCF is performed three times is designated as a base layer. Therefore, a ⅛-frame rate can be supported. A high-frequency image H3 generated after the MCTF is performed three times and the low-frequency image L3 of the base layer are used to support a ¼-frame rate. Similarly, three high-frequency images H2 and three low-frequency images L2 are used to support a ½-frame rate. Finally, six high-frequency images H1 and the images in layers lower than those of the six high-frequency images H1 are used to support an entire frame rate.

Spatial scalability can be provided using a hierarchical method such as an MPEG-2 or an MPEG-4. Quality scalability is implemented using the bit-plane coding method that uses block-based fine granular scalability (FGS). An FGS-enhanced bitstream is cut at a point and attached onto a base layer to provide an image of an enhancement layer. Quality scalability can be implemented using context-based coding.

Figure 11:
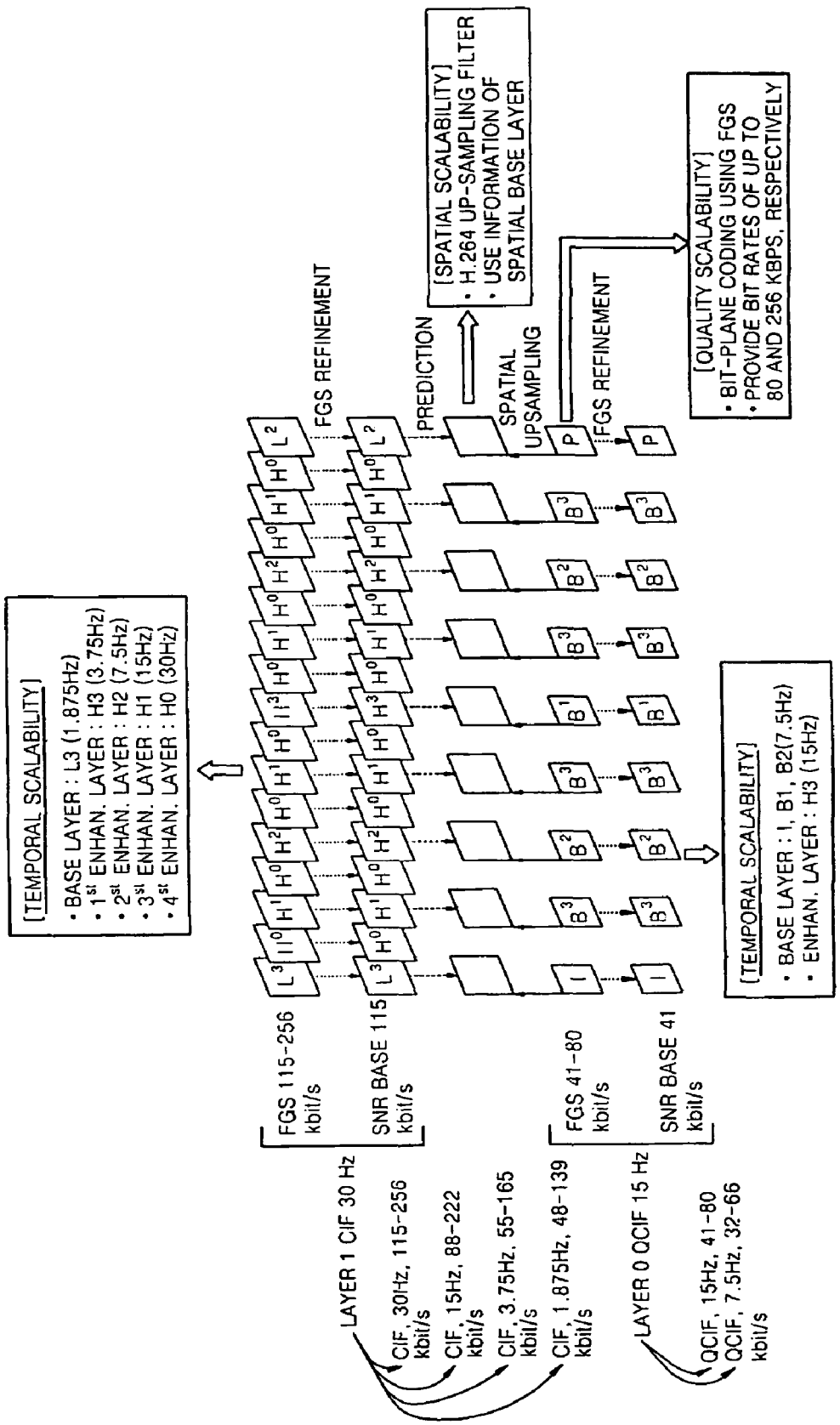
FIG. 11 is a conceptual diagram of a scalable structure which implements temporal, spatial, and quality scalabilities according to an exemplary embodiment of the present invention.

FIG. 11 is a conceptual diagram of a scalable structure which implements the temporal, spatial, and quality scalabilities. Referring to FIG. 11, a spatial base layer may have a QCIF 15 Hz-frame rate and implements temporal scalability using a hierarchical B-picture structure. This allows the spatial base layer to support a frame rate of up to 7.5 Hz. A basic bit rate of the spatial base layer is 41 Kbps, and coding is performed according to an AVC syntax. Quality scalability can be implemented on the base layer using the FGS, thereby supporting a bit rate of up to 80 Kbps. A QCIF 15 Hz and 80 Kbps image is up-sampled to serve as a point of reference in an upper spatial scalable layer. The upper spatial layer may have a CIF 30 Hz frame rate, implements temporal scalability through MCTF coding, and provides a frame rate of up to 1.875 Hz. A basic bit rate of the upper spatial layer is 115 Kbps, and quality scalability can be implemented on the upper spatial layer using the FGS, thereby supporting a bit rate of up to 256 Kbps.

The hierarchical B-pictures used to filter a multi-view image and the MCTF will now be described.

The hierarchical B-pictures can be implemented in various ways using a syntax of a memory management control operation (MMCO) and a reference picture list reordering (RPLR) for managing a decoded picture buffer (DPB) that can store 16 pictures used in an H.264 encoding method.

Figure 12:
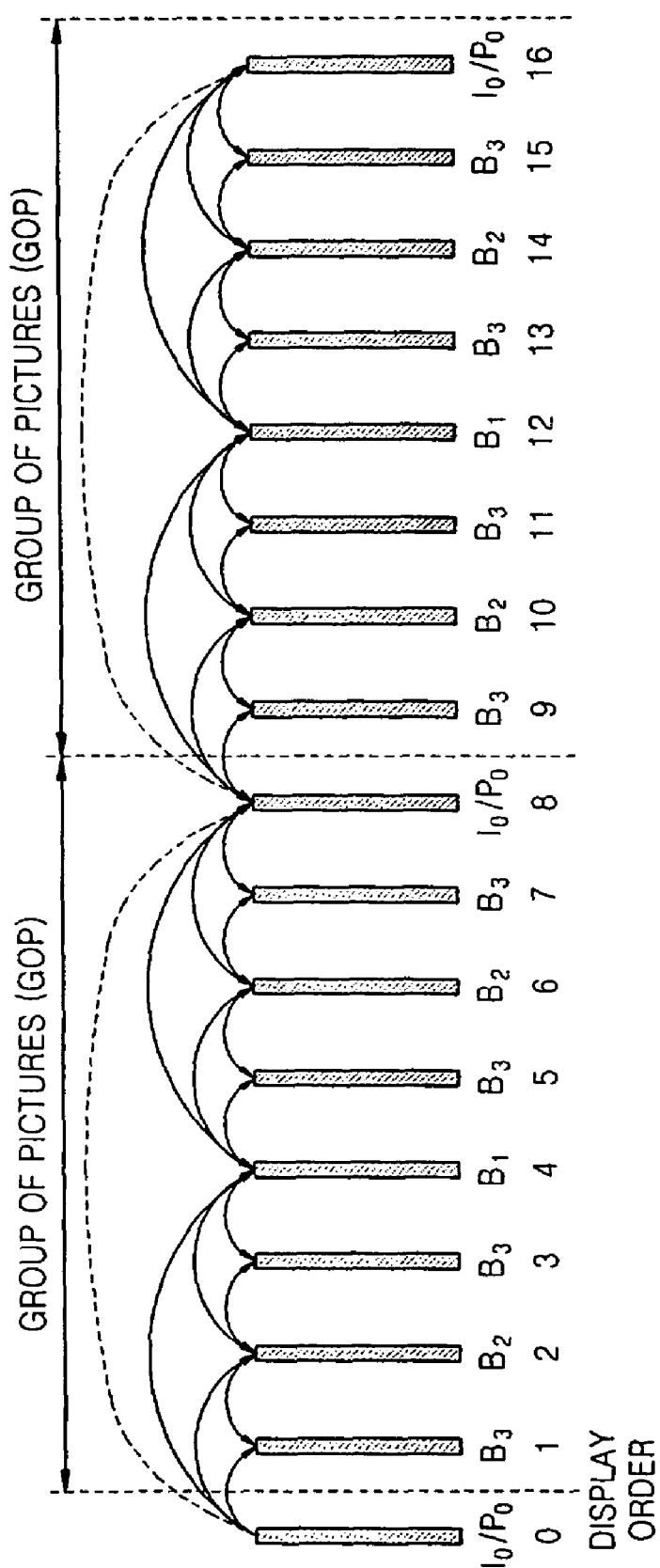
FIG. 12 is a conceptual diagram for illustrating hierarchical B-pictures with a dyadic hierarchical structure according to an exemplary embodiment of the present invention.

FIG. 12 is a conceptual diagram for illustrating hierarchical B-pictures with a dyadic hierarchical structure. Preferably, a GOP includes 8 pictures. Referring to FIG. 12, a first picture in an image sequence is encoded as an I picture or an IDR picture as in a conventional image-encoding standard. A last picture in the GOP is called a key picture and may be encoded as an I picture or a P picture. In FIG. 12, when the key picture is decoded, a ⅛-frame rate can be supported. When the key picture and a B1 picture are decoded, a ¼-frame rate can be supported. When the key picture, the B1 picture and a B2 picture are decoded, a ½-frame rate can be supported. When the key picture, the B1 picture, the B2 picture and a B3 picture are decoded, the entire frame rate can be supported.

Figure 13:
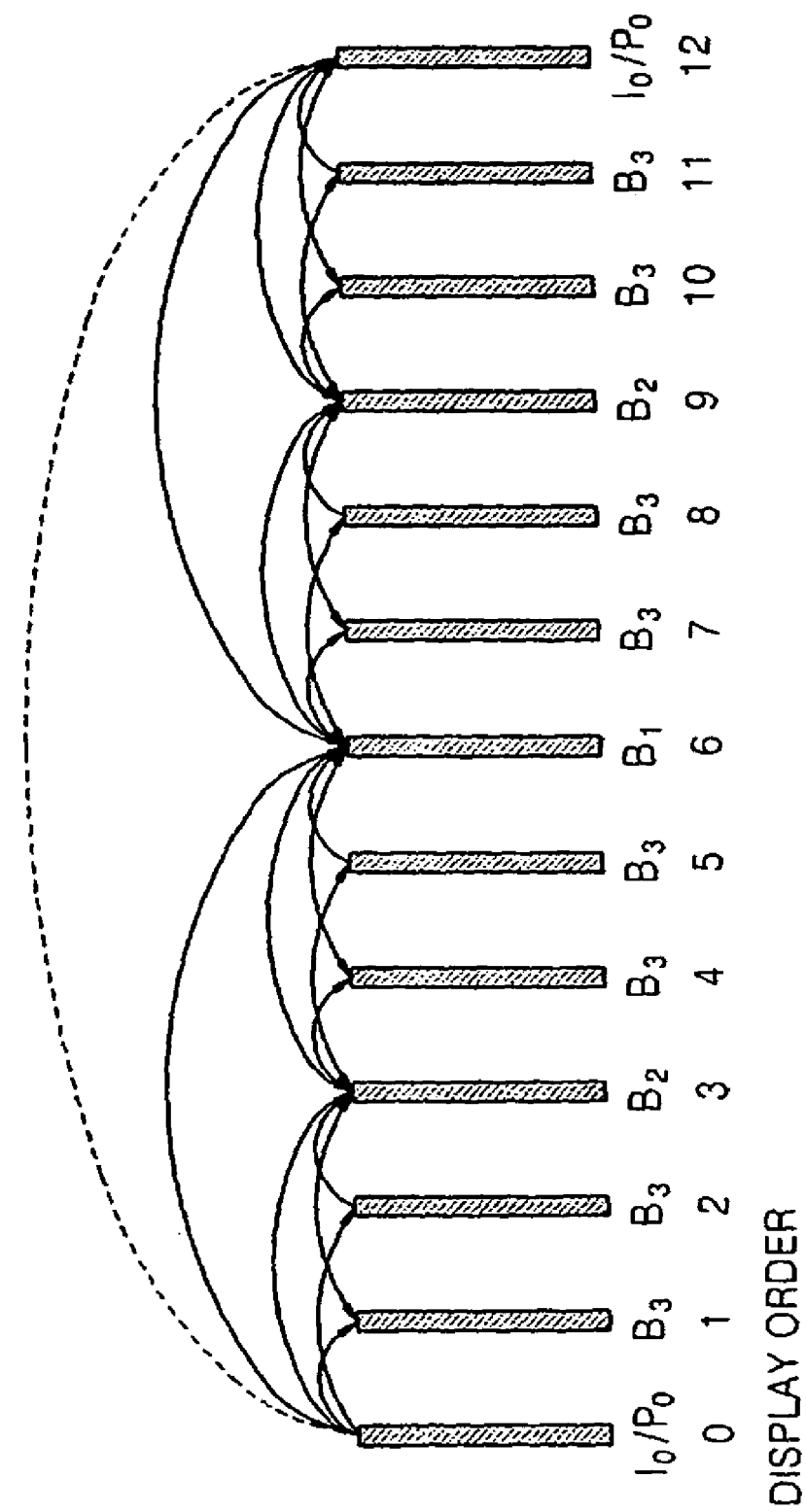
FIG. 13 is a conceptual diagram for illustrating hierarchical B-pictures without the dyadic hierarchical structure according to an exemplary embodiment of the present invention.

FIG. 13 is a conceptual diagram illustrating hierarchical B-pictures without the dyadic hierarchical structure. A GOP may not always be configured dyadically since frame rates vary according to various situations. Therefore, B-pictures should also be able to support a non-dyadic GOP structure to ultimately support all situations with different frame rates. In FIG. 13, when a key picture is decoded, a 1/12-frame rate can be supported. When the key picture and a B1 picture are decoded, a ⅙-frame rate can be supported. When the key picture, the B1 picture and a B2 picture are decoded, a ⅓-frame rate can be supported. When the key picture, the B1 picture, the B2 picture and a B3 picture are decoded, the entire frame rate can be supported.

In an exemplary embodiment of the present invention, images are filtered using the MCTF or the hierarchical B-pictures described above. A method of filtering images using the MCTF will now be described. However, it will be easily understood by those of ordinary skill in the art that multi-view images can be spatially and temporally filtered using the hierarchical B-pictures in a similar manner.

A scalable multi-view image encoding method and apparatus according to an exemplary embodiment of the present invention will now be described.

The method and apparatus convert a multi-view image into one bitstream to provide various resolutions, frame rates, and qualities. The method and apparatus also convert a multi-view image into one bitstream to provide the bitstream according to various terminals with different processing capabilities.

Figure 14:
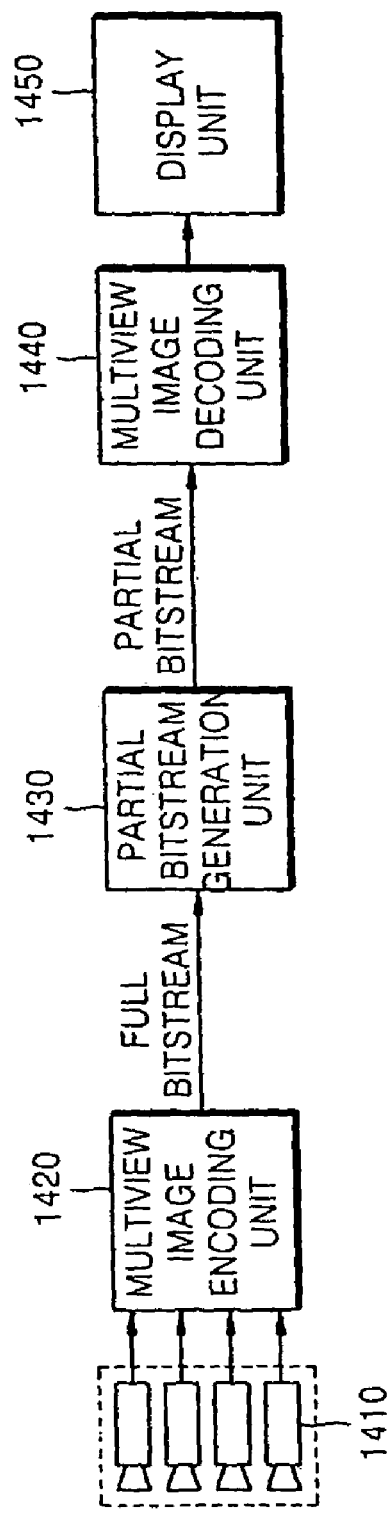
FIG. 14 illustrates the structure of a scalable multi-view image codec including scalable multi-view image encoding and decoding apparatuses according to an exemplary embodiment of the present invention.

FIG. 14 illustrates the structure of a scalable multi-view image codec including scalable multi-view image encoding and decoding apparatuses. Referring to FIG. 14, the multi-view scalable image codec includes a multi-view image encoding unit 1420, a partial bitstream generation unit 1430, and a multi-view image decoding unit 1440. The multi-view image encoding unit 1420 performs scalable encoding on multi-view images received from a plurality of cameras 1410 and generates a full bitstream with temporal, spatial and quality scalabilities. The partial bitstream generation unit 1430 generates a partial bitstream so that the full bitstream can be partially decoded according to temporal, spatial and quality resolutions. The full bitstream or the partial bitstream which is are reconstructed by the multi-view image decoding unit 1440 and displayed on a display unit 1450.

Figure 15:
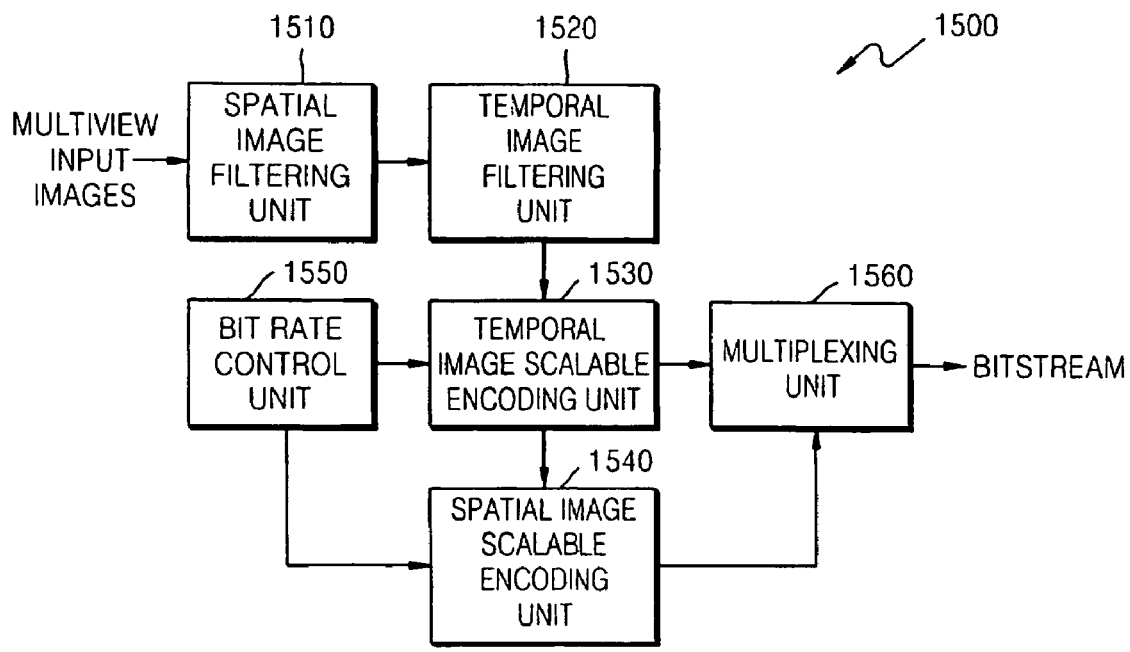
FIG. 15 is a block diagram of a scalable multi-view image encoding apparatus according to an exemplary embodiment of the present invention.
Figure 16:
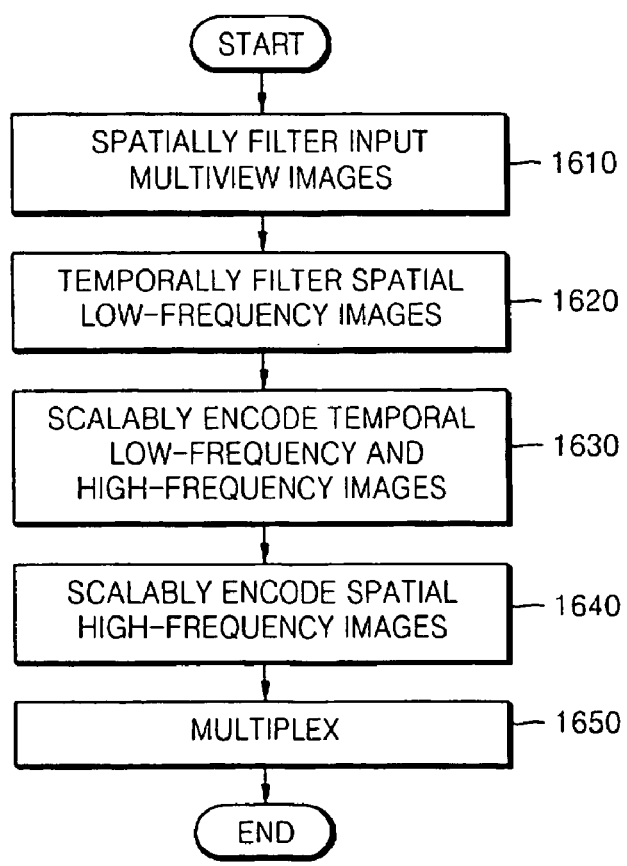
FIG. 16 is a flowchart illustrating a scalable multi-view image encoding method according to an exemplary embodiment of the present invention.

FIG. 15 is a block diagram of a scalable multi-view image encoding apparatus 1500 according to an exemplary embodiment of the present invention. FIG. 16 is a flowchart illustrating a scalable multi-view image encoding method according to an exemplary embodiment of the present invention. Referring to FIG. 15, the scalable multi-view image encoding apparatus 1500 includes a spatial image filtering unit 1510, a temporal image filtering unit 1520, a temporal image scalable encoding unit 1530, a spatial image scalable encoding unit 1540, a bit rate control unit 1550, and a multiplexing unit 1560.

The spatial image filtering unit 1510 spatially filters a group of 2D images on a spatial axis, which are input from M cameras for an N period of time, using the MCTF or the hierarchical B-pictures (operation 1610). In the group of 2D images on the spatial axis, images input at the same time are spatially filtered. After the spatial filtering, a spatial low-frequency image and (M−1) spatial high-frequency images are generated. The spatial image filtering unit 1510 may have a closed loop structure in which M images input from M cameras are used and repeats spatial filtering for an N period of time.

The temporal image filtering unit 1520 filters N spatial low-frequency images, which are generated after the spatial filtering, using the MCTF or the hierarchical B-picture structures (operation 1620). After the N spatial low-frequency images generated by the spatial image filtering unit 1510 for the N period of time are temporally filtered, a temporal low-frequency image and (N−1) temporal high-frequency images are generated. The temporal image filtering unit 1520 may have an open loop structure in which a temporal low-frequency image previously generated after a previous group of 2D images are filtered using the MCTF or the hierarchical B-pictures.

The temporal image scalable encoding unit 1530 is controlled by the bit rate control unit 1550. The temporal image scalable encoding unit 1530 performs scalable encoding on the temporal low-frequency image and the (N−1) temporal high-frequency images generated by the temporal image filtering unit 1530 according to a transmission bit rate allocated to the group of 2D images and temporal resolution required (operation 1630). In scalable encoding, the 2D spatial transform, the texture coding, and the motion coding described above are performed in a manner similar to that of the widely known scalable encoding method.

The spatial image scalable encoding unit 1540 performs scalable encoding on the (M−1) spatial high-frequency images generated by the spatial image filtering unit 1510 in consideration of a bit rate allocated to the temporal low-frequency image and the (N−1) temporal high-frequency images and a spatial resolution required (operation 1640).

The multiplexing unit 1560 multiplexes the spatio-temporal low-frequency and high-frequency images encoded by the temporal image scalable encoding unit 1530 and the spatial image scalable encoding unit 1540 and outputs a bitstream (operation 1650).

The scalable multi-view image encoding method and apparatus will now be described in more detail.

Figure 17:
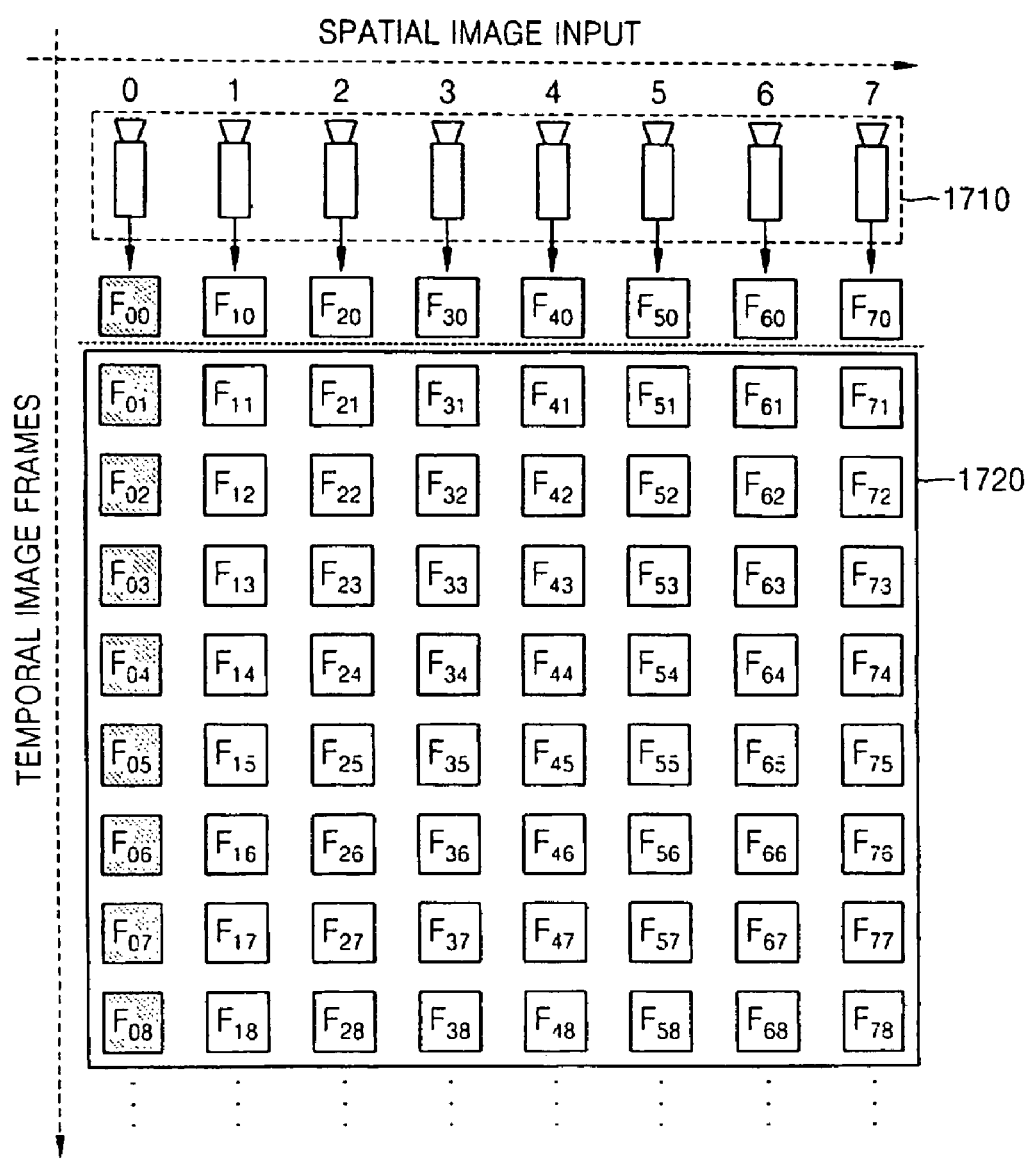
FIG. 17 illustrates a group of two-dimensional (2D) images according to an exemplary embodiment of the present invention.

FIG. 17 illustrates a group of 2D images (hereinafter, referred to as a 2D GOP) according to an exemplary embodiment of the present invention. To perform scalable-encoding on multi-view images input from a plurality of cameras, an exemplary embodiment of the present invention uses a 2D GOP different from a conventional GOP input for a predetermined period of time from one camera. The 2D GOP group includes M images on the spatial axis which are input from M multi-view cameras at predetermined time intervals and N images on the temporal axis which are input from the M multi-view cameras for a predetermined N period of time. In other words, the M images are input from the M cameras in a spatial-axis direction, and the N images are input from the M cameras in a temporal-axis direction to form a group of M×N 2D images. In this case, for the filtering operation using the MCTF or the hierarchical B-pictures, $M=2^m$ and $N=2^n$ (where m and n are integers).

FIG. 17 illustrates a 2D GOP 1720 formed when 8 images in the temporal-axis direction are input from a multi-view camera 1710 comprised of 8 cameras as an example. In FIG. 17, subsequent images in the temporal-axis direction, which are respectively input from the 8 cameras, are illustrated under the cameras in a temporal order. $F_{xy}$ indicates an image input from an $x^{th}$ camera at an $y^{th}$ time. For example, $F_{00}$, $F_{10}$, $F_{20}$, $F_{30}$, $F_{40}$, $F_{50}$, $F_{60}$ and $F_{70}$ indicate images first input from the cameras included in the multi-view camera 1710. Also, $F_{00}$, $F_{01}$, $F_{02}$, $F_{03}$, $F_{04}$, $F_{05}$, $F_{06}$, $F_{07}$ and $F_{08}$ indicate images sequentially input from a firs camera in the temporal-axis direction.

An exemplary embodiment of the present invention performs the MCTF on the 2D GOP 1720 in the spatial-axis and temporal-axis directions for partial spatial decoding and partial temporal decoding. The conventional art filters multi-view images on the temporal axis using the MCTF or the hierarchical B pictures. An exemplary embodiment of the present invention differs from the conventional art because a spatial filtering process is included in which multi-view images simultaneously input from M cameras are filtered using the MCTF or the hierarchical B pictures to generate a spatial low-frequency image and (M−1) spatial high-frequency images and a temporal filtering process in which M spatial low-frequency images generated after the spatial filtering process are temporally filtered using the MCTF or the hierarchical B pictures to generate a temporal low-frequency image and (N−1) temporal high-frequency images.

Figure 18:
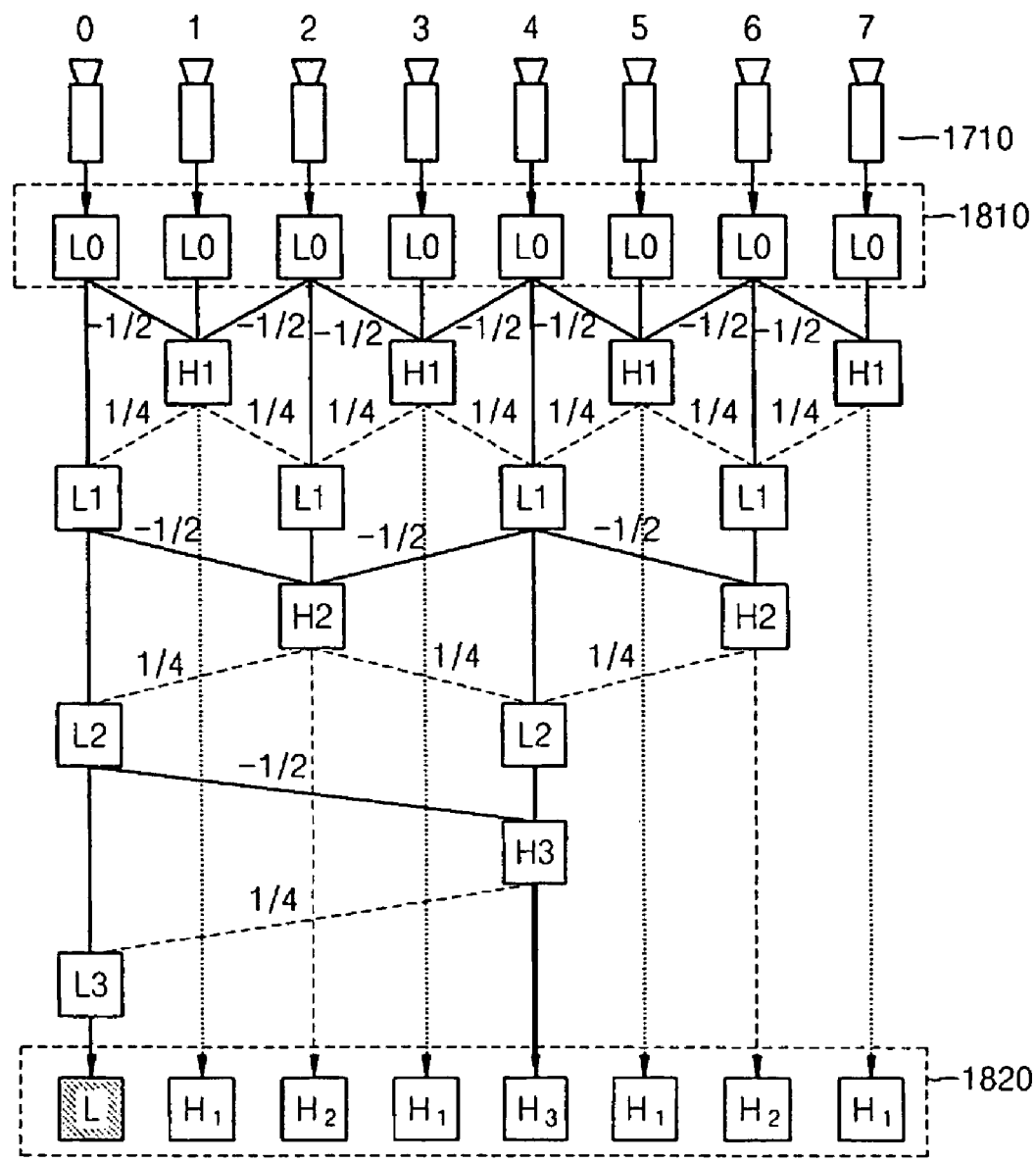
FIG. 18 illustrates a process of spatially filtering multi-view images according to an exemplary embodiment of the present invention.

FIG. 18 illustrates a process of spatially filtering multi-view images according to an exemplary embodiment of the present invention. As described above, the spatial filtering of multi-view images performed by the spatial image filtering unit 1510 relates to decomposing multi-view images on the spatial axis, which are input simultaneously, in the 2D GOP 1720 illustrated in FIG. 17 into low-frequency and high-frequency images. The MCTF or the hierarchical B-pictures described above may be used for spatial filtering. Spatial filtering may have the closed-loop structure in which M images input from M cameras are used. In FIG. 18, L0 images 1810 indicate original images respectively and simultaneously input from the multi-view camera 1710 comprised of the 8 cameras. In other words, the L0 images 1810 indicate $F_{0i}$, $F_{1i}$, $F_{2i}$, $F_{3i}$, $F_{4i}$, $F_{5i}$, $F_{6i}$, and $F_{7i}$ simultaneously input from the cameras at an $i^{th}$ time in the 2D GOP 1720 illustrated in FIG. 17. For example, the L0 images 1810 may be F01, F11, F21, $F_{31}$, $F_{41}$, $F_{51}$, $F_{61}$, and $F_{71}$. As described MCTF, an H1 residual image can be obtained after L0 images which are input from cameras on both sides of an even-numbered camera and are respectively multiplied by ½ are subtracted from an L0 image input from the even-numbered camera (prediction operation). An L1 image is obtained after H1 residual images which are input from cameras on both sides of an odd-numbered camera and are respectively multiplied by ¼ are added to an image input from the odd-numbered camera (update operation). Multi-view images simultaneously input from the 8 cameras through this process are decomposed into a low-frequency image L3 and 7 high-frequency images H1, H2, H1, H3, H1, H2 and H1. The low-frequency image L3 and the high-frequency images H1, H2, H1, H3, H1, H2 and H1 generated after the spatial filtering are scalably encoded in a predetermined order.

Figure 19:
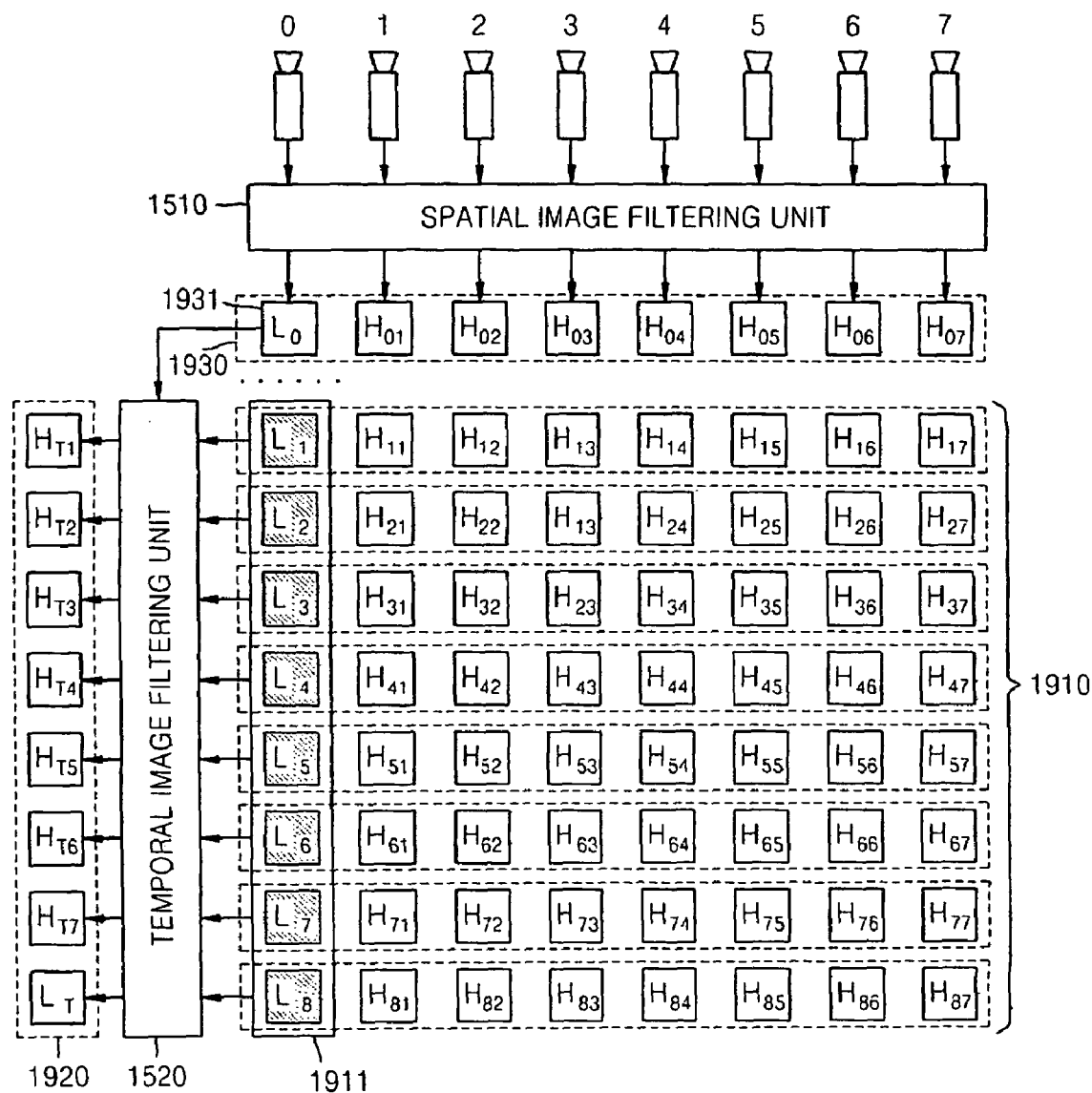
FIG. 19 illustrates the relationship between spatial filtering and temporal filtering used for scalably encoding multi-view images according to an exemplary embodiment of the present invention.

FIG. 19 illustrates the relationship between spatial filtering and temporal filtering used for scalably encoding multi-view images according to an exemplary embodiment of the present invention. As described above, the temporal image filtering unit 1510 spatially filters images on the spatial axis, which are simultaneously input from a plurality of cameras, in the spatial-axis direction using the MCTF or the hierarchical B pictures. The temporal image filtering unit also decomposes images input at an $i^{th}$ time into a spatial low-frequency image and a plurality of spatial high-frequency images. An L0 image 1931 among first images 1930 input respectively from the cameras is intra-encoded. The other images $H_{01}$, $H_{02}$, $H_{03}$, $H_{04}$, $H_{05}$, $H_{06}$ an $H_{07}$ on the spatial axis are spatially filtered. Eight images input at an $i^{th}$ time subsequent to the first images 1930 are spatially filtered and are decomposed into a spatial low-frequency image and seven spatial high-frequency images. Such a spatial filtering process is repeatedly performed on images simultaneously input in a 2D GOP. Consequently, the images in the 2D GOP are decomposed into N (=8) low-frequency images $\{L_1, L_2, L_3, L_4, L_5, L_6, L_7, L_8\}$ and (M−1)×N high-frequency images $\{H_{11}, H_{12}, H_{13}, H_{14}, H_{15}, H_{16}, H_{17}\}$, $\{H_{21}, H_{22}, H_{23}, H_{24}, H_{25}, H_{26}, H_{27}\}$, $\{H_{31}, H_{32}, H_{33}, H_{34}, H_{35}, H_{36}, H_{37}\}$, $\{H_{41}, H_{42}, H_{43}, H_{44}, H_{45}, H_{46}, H_{47}\}$, $\{H_{51}, H_{52}, H_{53}, H_{54}, H_{55}, H_{56}, H_{57}\}$, $\{H_{61}, H_{62}, H_{63}, H_{64}, H_{65}, H_{66}, H_{67}\}$, $\{H_{71}, H_{72}, H_{73}, H_{74}, H_{75}, H_{76}, H_{77}\}$ and $\{H_{81}, H_{82}, H_{83}, H_{84}, H_{85}, H_{86}, H_{87}\}$. Eight images in the spatial-axis direction, which are respectively input from the eight cameras, are decomposed into a spatial low-frequency image and seven low-frequency images to generate $\{L_i, H_{i1}, H_{i2}, H_{i3}, H_{i4}, H_{i5}, H_{i6}, H_{i7}\}$.

The temporal image filtering unit 1520 temporally filters N (=8) spatial low-frequency images 1911 on the temporal axis using the MCTF or the hierarchical B-pictures and generates a group 1920 of a temporal low-frequency image $L_T$ and temporal high-frequency images $\{H_{T1}, H_{T2}, H_{T3}, H_{T4}, H_{T5}, H_{T6}, H_{T7}\}$. The low-frequency image $L_T$ generated on the temporal axis is used later when a next 2D GOP is temporally filtered.

Figure 20:
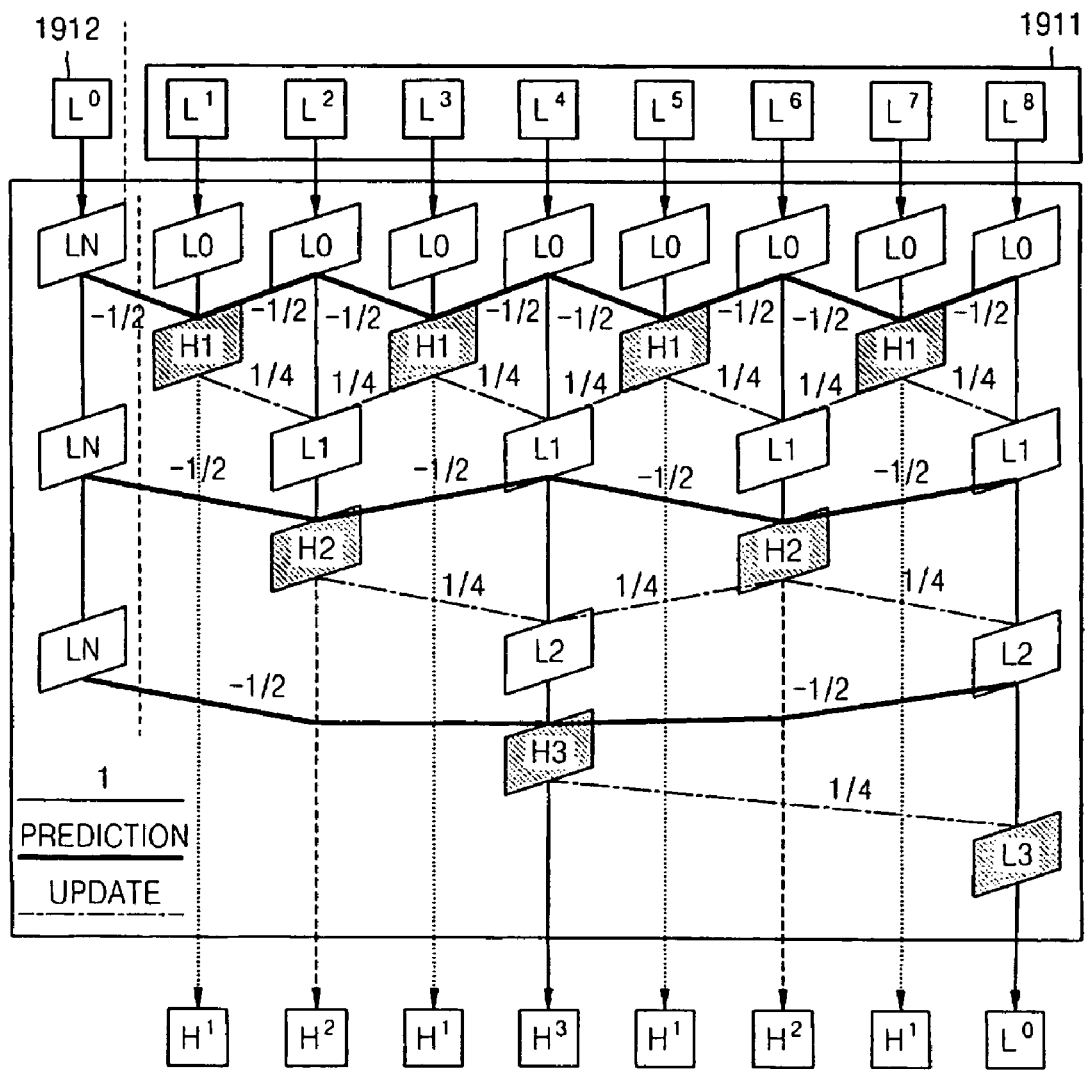
FIG. 20 illustrates a process of temporally filtering spatial low-frequency images generated after the spatial filtering process according to an exemplary embodiment of the present invention.

FIG. 20 illustrates a process of temporally filtering spatial low-frequency images generated after the spatial filtering process according to an exemplary embodiment of the present invention. FIG. 20 illustrates a case in which a group of 2D images respectively input from eight cameras for eight time units are temporally filtered. Referring to FIG. 20, a first L0 image 1912 is a low-frequency image in a previous 2D GOP, which is last generated after the temporal filtering process, and is referred to in the prediction operation.

At the beginning of a multi-view image sequence, a first group 1911 of images input from each camera is not included in a 2D GOP and subsequent groups of images are included in the 2D GOP. In the first group of images 1911 input from the cameras, an image input from a first camera is intra-coded, and the other images are spatially filtered and then encoded. Temporally filtering a 2D GOP is identical to the MCTF except that spatial low-frequency images generated after the spatial filtering process are used in the temporal filtering process. A temporal low-frequency image and temporal high-frequency images generated after the temporal filtering process are scalably encoded in a predetermined order.

Figure 21:
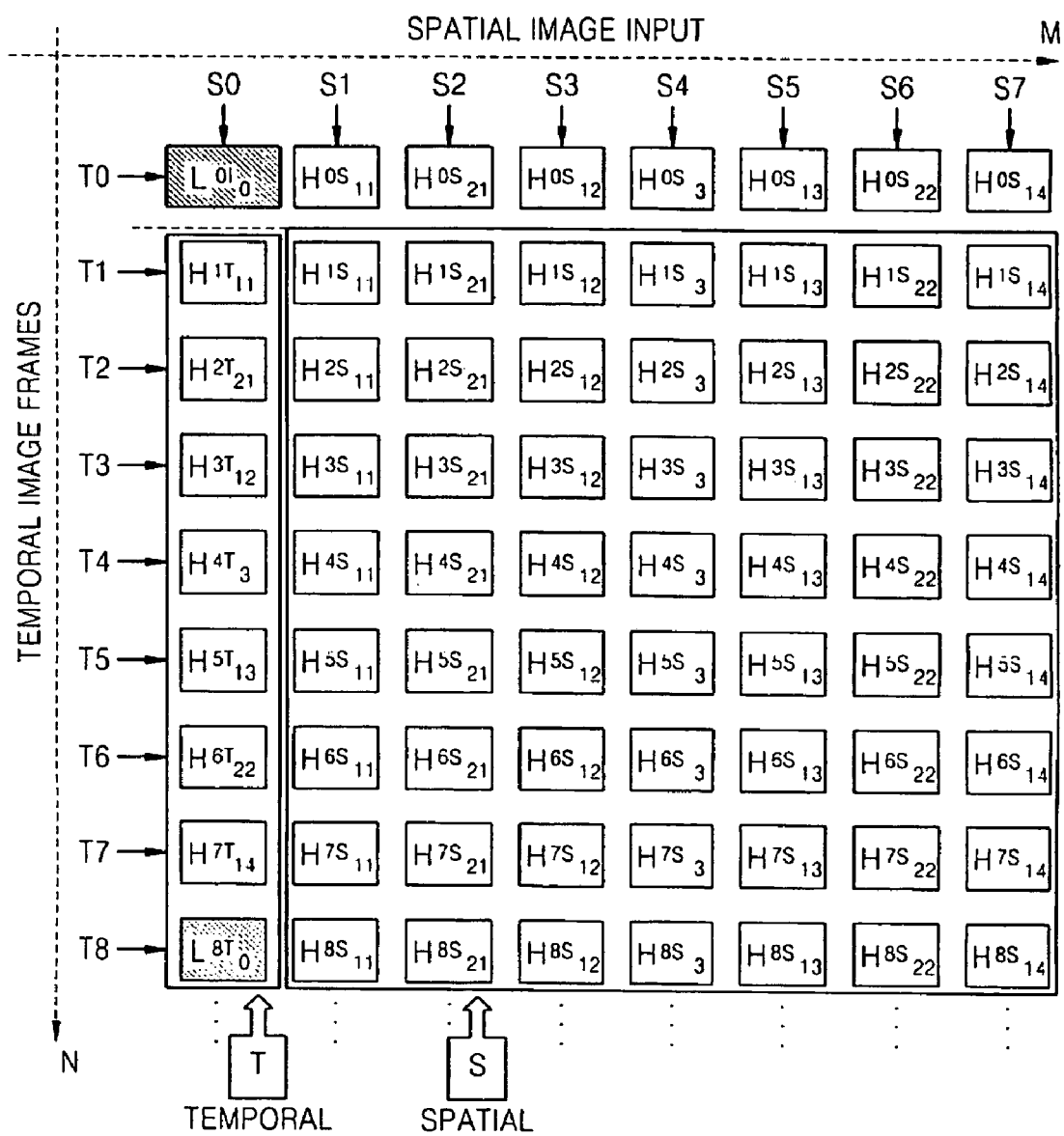
FIG. 21 illustrates a scalable multi-view image encoding process according to an exemplary embodiment of the present invention.

FIG. 21 illustrates a scalable multi-view image encoding process according to an exemplary embodiment of the present invention. A process of spatially and temporally filtering a group of 8×8 2D images and scalably encoding the filtered images will now be described with reference to FIG. 21.

An $L^{0I}_0$ image in a first group of images input from M, for example, eight cameras S0 through S7 is intra-encoded, and the other (M−1) images in the spatial-axis direction are spatially filtered on the spatial-axis direction using the MCTF or the hierarchical B pictures and then encoded. Consequently, a bitstream is generated in the order of $H^{0S}_3$, $H^{0S}_{21}$, $H^{0S}_{22}$, $H^{0S}_{11}$, $H^{0S}_{12}$, $H^{0S}_{13}$, and $H^{0S}_{14}$.

After the first group of images input from the 8 cameras are encoded, M×N images (M=8 and N=8 in the present embodiment) in each 2D GOP are sequentially processed.

Whenever each of N (=8) 2D GOPs is input from the M cameras in the temporal-axis direction, spatial filtering is performed in the spatial-axis direction. As a result, a spatial low-frequency image comprised $L^{iT}_0$, $H^{iS}_{11}$, $H^{iS}_{21}$, $H^{iS}_{12}$, $H^{iS}_3$, $H^{iS}_{13}$, $H^{iS}_{22}$, $H^{iS}_{14}$ and (M (=8)−1) spatial high-frequency images are generated on each $i^{th}$ temporal axis.

The N (=8) spatial low-frequency images $\{L^{1T}_0, L^{2T}_0, \ldots, L^{8T}_0\}$ generated after the spatial filtering process are temporally filtered in the temporal-axis direction to generate a group of one temporal low-frequency image $L^{8T}_0$ and (N (=8)−1) temporal high-frequency images $\{H^{1T}_{11}, H^{2T}_{21}, H^{3T}_{12}, H^{4T}_3, H^{5T}_{13}, H^{6T}_{22}, H^{7T}_{14}, L^{8T}_0\}$.

As described above, when a group of M×N images are spatially and temporally filtered using the MCTF, the M×N images included in the group are converted into one low-frequency image and (M×N−1) high-frequency images. Then, images on the temporal axis, which serve as reference images, are scalably encoded according to a temporal resolution, and corresponding images on the spatial axis are encoded. The temporal image scalable encoding unit 1530 performs temporal scalable encoding on the temporal low-frequency and high-frequency images at a transmission bit rate allocated to the group of M×N images at the control of the bit rate control unit 1550 to transmit the group to the decoding end. A temporal scalable encoding method is performed in a manner similar to that of a conventional H.264 encoding method. An image generated as a result of spatio-temporal filtering is determined as an intra-block or an inter-block. An intra-block is encoded using texture coding, and an inter-block is encoded using a motion vector and a residual signal. The bit rate control unit 1550 controls a bit rate at which images input from a plurality of cameras can be transmitted when the images are all encoded. For example, when a target bit rate is 512 Kbps and images input from 8 cameras have a total of 100 frames, an average transmission bit rate when the entire 1000 frames are encoded must be 512 kbps. Therefore, the bit rate control unit 1550 allocates a bit of a particular size to each 2D GOP or each encoded image, thereby generating an average bit rate when all images are encoded and meet a target bit rate. The bit rate control unit 1550 can be implemented using various methods.

The spatial image scalable encoding unit 1540 performs spatial scalable encoding on a group of spatial high-frequency images $\{H^{iS}_{11}, H^{iS}_{21}, H^{iS}_{12}, H^{iS}_3, H^{iS}_{13}, H^{iS}_{22}, H^{iS}_{14}\}$ on each $i^{th}$ time axis in consideration of bits allocated to the temporal high-frequency images $\{H^{1T}_{11}, H^{2T}_{21}, H^{3T}_{12}, H^{4T}_3, H^{5T}_{13}, H^{6T}_{22}, H^{7T}_{14}, L^{8T}_0\}$ and a required spatial resolution A bitstream for the temporal low-frequency and high-frequency images generated after the temporal scalable encoding is generated in the order of $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ and is transmitted to the decoding end. The transmission order begins from a base layer generated last in the MCTF. Then, the base layer is followed by an upper enhancement layer.

A for images on the spatial axis is transmitted to the decoding end in the same transmission order as the bitstream for the temporal low-frequency and high-frequency images. In other words, since a for $L^{8T}_0$ on the temporal axis has been transmitted first, a bitstream for images $\{H^{8S}_3, H^{8S}_{21}, H^{8S}_{22}, H^{8S}_{11}, H^{8S}_{12}, H^{8S}_{13}, H^{8S}_{14}\}$ on an $8^{th}$ axis is transmitted. Also, since a bitstream for $H^{4T}_3$ on a next temporal axis has been transmitted, a bitstream for $\{H^{4S}_3, H^{4S}_{21}, H^{4S}_{22}, H^{4S}_{11}, H^{4S}_{12}, H^{4S}_{13}, H^{4S}_{14}\}$ is transmitted. This process is required for partial temporal decoding and partial spatial decoding at the decoding end. A bitstream for a group of spatial high-frequency images on the spatial axis is transmitted to the decoding end in the order of $\{(H^{8S}_3, H^{8S}_{21}, H^{8S}_{22}, H^{8S}_{11}, H^{8S}_{12}, H^{8S}_{13}, H^{8S}_{14}), (H^{4S}_3, H^{4S}_{21}, H^{4S}_{22}, H^{4S}_{11}, H^{4S}_{12}, H^{4S}_{13}, H^{4S}_{14}), (H^{2S}_3, H^{2S}_{21}, H^{2S}_{22}, H^{2S}_{11}, H^{2S}_{12}, H^{2S}_{13}, H^{2S}_{14}), (H^{6S}_3, H^{6S}_{21}, H^{6S}_{22}, H^{6S}_{11}, H^{6S}_{12}, H^{6S}_{13}, H^{6S}_{14}), (H^{1S}_3, H^{1S}_{21}, H^{1S}_{22}, H^{1S}_{11}, H^{1S}_{12}, H^{1S}_{13}, H^{1S}_{14}), (H^{3S}_3, H^{3S}_{21}, H^{3S}_{22}, H^{3S}_{11}, H^{3S}_{12}, H^{3S}_{13}, H^{3S}_{14}), (H^{5S}_3, H^{5S}_{21}, H^{5S}_{22}, H^{5S}_{11}, H^{5S}_{12}, H^{5S}_{13}, H^{5S}_{14}), (H^{7S}_3, H^{7S}_{21}, H^{7S}_{22}, H^{7S}_{11}, H^{7S}_{12}, H^{7S}_{13}, H^{7S}_{14})\}$. The above process is repeated on the entire image sequence for each 2D GOP.

A bitstream generated in the process of scalably encoding a multi-view image may be configured according to spatial and temporal resolutions. An example of bitstream configuration according to the temporal resolution will now be described.

Referring back to FIG. 21, a bitstream with a full temporal resolution may have information regarding all images $\{L^{8T}_0, H^{4T}_3, H^{2T}_{21}, H^{6T}_{22}, H^{1T}_{11}, H^{3T}_{12}, H^{5T}_{13}, H^{7T}_{14}\}, \{(H^{8S}_3, H^{8S}_{21}, H^{8S}_{22}, H^{8S}_{11}, H^{8S}_{12}, H^{8S}_{13}, H^{8S}_{14}), (H^{4S}_3, H^{4S}_{21}, H^{4S}_{22}, H^{4S}_{11}, H^{4S}_{12}, H^{4S}_{13}, H^{4S}_{14}), (H^{2S}_3, H^{2S}_{21}, H^{2S}_{22}, H^{2S}_{11}, H^{2S}_{12}, H^{2S}_{13}, H^{2S}_{14}), (H^{6S}_3, H^{6S}_{21}, H^{6S}_{22}, H^{6S}_{11}, H^{6S}_{12}, H^{6S}_{13}, H^{6S}_{14}), (H^{1S}_3, H^{1S}_{21}, H^{1S}_{22}, H^{1S}_{11}, H^{1S}_{12}, H^{1S}_{13}, H^{1S}_{14}), (H^{3S}_3, H^{3S}_{21}, H^{3S}_{22}, H^{3S}_{11}, H^{3S}_{12}, H^{3S}_{13}, H^{3S}_{14}), (H^{5S}_3, H^{5S}_{21}, H^{5S}_{22}, H^{5S}_{11}, H^{5S}_{12}, H^{5S}_{13}, H^{5S}_{14}), (H^{7S}_3, H^{7S}_{21}, H^{7S}_{22}, H^{7S}_{11}, H^{7S}_{12}, H^{7S}_{13}, H^{7S}_{14})\}$ in a 2D GOP.

A bitstream with a half temporal resolution includes information regarding images $\{L^{8T}_0, H^{4T}_3, H^{2T}_{21}, H^{6T}_{22}\}, \{(H^{8S}_3, H^{8S}_{21}, H^{8S}_{22}, H^{8S}_{11}, H^{8S}_{12}, H^{8S}_{13}, H^{8S}_{14}), (H^{4S}_3, H^{4S}_{21}, H^{4S}_{22}, H^{4S}_{11}, H^{4S}_{12}, H^{4S}_{13}, H^{4S}_{14}), (H^{2S}_3, H^{2S}_{21}, H^{2S}_{22}, H^{2S}_{11}, H^{2S}_{12}, H^{2S}_{13}, H^{2S}_{14}), (H^{6S}_3, H^{6S}_{21}, H^{6S}_{22}, H^{6S}_{11}, H^{6S}_{12}, H^{6S}_{13}, H^{6S}_{14})\}$. Four images in the temporal-axis direction among the images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ generated after the temporal filtering process are encoded, and corresponding high-frequency images in the spatial-axis direction are included in the bitstream with the half temporal resolution.

A bitstream with a ¼ temporal resolution includes information regarding images $\{L^{8T}_0, H^{4T}_3\}$, $\{(H^{8S}_3, H^{8S}_{21}, H^{8S}_{22}, H^{8S}_{11}, H^{8S}_{12}, H^{8S}_{13}, H^{8S}_{14}), (H^{4S}_3, H^{4S}_{21}, H^{4S}_{22}, H^{4S}_{11}, H^{4S}_{12}, H^{4S}_{13}, H^{4S}_{14})\}$. In other words, two images in the temporal-axis direction among $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ generated after the temporal filtering process are encoded, and corresponding high-frequency images in the spatial-axis direction are included in the bitstream with the ¼ temporal resolution.

A bitstream with a ⅛ temporal resolution includes information regarding images $\{L^{8T}_0\}$, $\{(H^{8S}_3, H^{8S}_{21}, H^{8S}_{22}, H^{8S}_{11}, H^{8S}_{12}, H^{8S}_{13}, H^{8S}_{14})\}$.

An example of bitstream configuration according to the spatial resolution will now be described. In an exemplary embodiment of the present invention, the spatial resolution denotes a view resolution provided to a user from a plurality of cameras' images. For example, the bitstream with full view resolution contains the encoded image of all the cameras, the bitstream with ½ view resolution contains the encoded image of the selected ½ camera image among all the cameras' images, and the bitstream with ¼ view resolution contains the encoded image of the selected ¼ camera image among all the cameras' images.

Referring to FIG. 21, like the with the full temporal resolution, a bitstream with a full spatial resolution may have information regarding all images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$, $\{(H^{8S}_3, H^{8S}_{21}, H^{8S}_{22}, H^{8S}_{11}, H^{8S}_{12}, H^{8S}_{13}, H^{8S}_{14}), (H^{4S}_3, H^{4S}_{21}, H^{4S}_{22}, H^{4S}_{11}, H^{4S}_{12}, H^{4S}_{13}, H^{4S}_{14}), (H^{2S}_3, H^{2S}_{21}, H^{2S}_{22}, H^{2S}_{11}, H^{2S}_{12}, H^{2S}_{13}, H^{2S}_{14}), (H^{6S}_3, H^{6S}_{21}, H^{6S}_{22}, H^{6S}_{11}, H^{6S}_{12}, H^{6S}_{13}, H^{6S}_{14}), (H^{1S}_3, H^{1S}_{21}, H^{1S}_{22}, H^{1S}_{11}, H^{1S}_{12}, H^{1S}_{13}, H^{1S}_{14}), (H^{3S}_3, H^{3S}_{21}, H^{3S}_{22}, H^{3S}_{11}, H^{3S}_{12}, H^{3S}_{13}, H^{3S}_{14}), (H^{5S}_3, H^{5S}_{21}, H^{5S}_{22}, H^{5S}_{11}, H^{5S}_{12}, H^{5S}_{13}, H^{5S}_{14}), (H^{7S}_3, H^{7S}_{21}, H^{7S}_{22}, H^{7S}_{11}, H^{7S}_{12}, H^{7S}_{13}, H^{7S}_{14})\}$ in a 2D GOP.

A bitstream with a half spatial resolution is a bitstream with information regarding images input from four out of eight cameras. This includes information regarding images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$, $\{(H^{8S}_3, H^{8S}_{21}, H^{8S}_{22}), (H^{4S}_3, H^{4S}_{21}, H^{4S}_{22}), (H^{2S}_3, H^{2S}_{21}, H^{2S}_{22}), (H^{6S}_3, H^{6S}_{21}, H^{6S}_{22}), (H^{1S}_3, H^{1S}_{21}, H^{1S}_{22}), (H^{3S}_3, H^{3S}_{21}, H^{3S}_{22}), (H^{5S}_3, H^{5S}_{21}, H^{5S}_{22}), (H^{7S}_3, H^{7S}_{21}, H^{7S}_{22})\}$. The bitstream includes information regarding images input from odd-numbered cameras, that is, S0, S2, S4, and S6 out of the 8 cameras S0 through S7 illustrated in FIG. 21.

A bitstream with a ¼ spatial resolution is a bitstream with information regarding images input from 2 out of the 8 cameras. This includes information regarding images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$, $\{(H^{8S}_3), (H^{4S}_3), (H^{2S}_3), (H^{6S}_3), (H^{1S}_3), (H^{3S}_3), (H^{5S}_3), (H^{7S}_3)\}$.

A bitstream with a ⅛ spatial resolution is a bitstream with information regarding images input from one camera. This includes information regarding images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$.

FIGS. 22 through 25 illustrate bitstreams generated in the scalable multi-view image encoding process.

Figure 22:
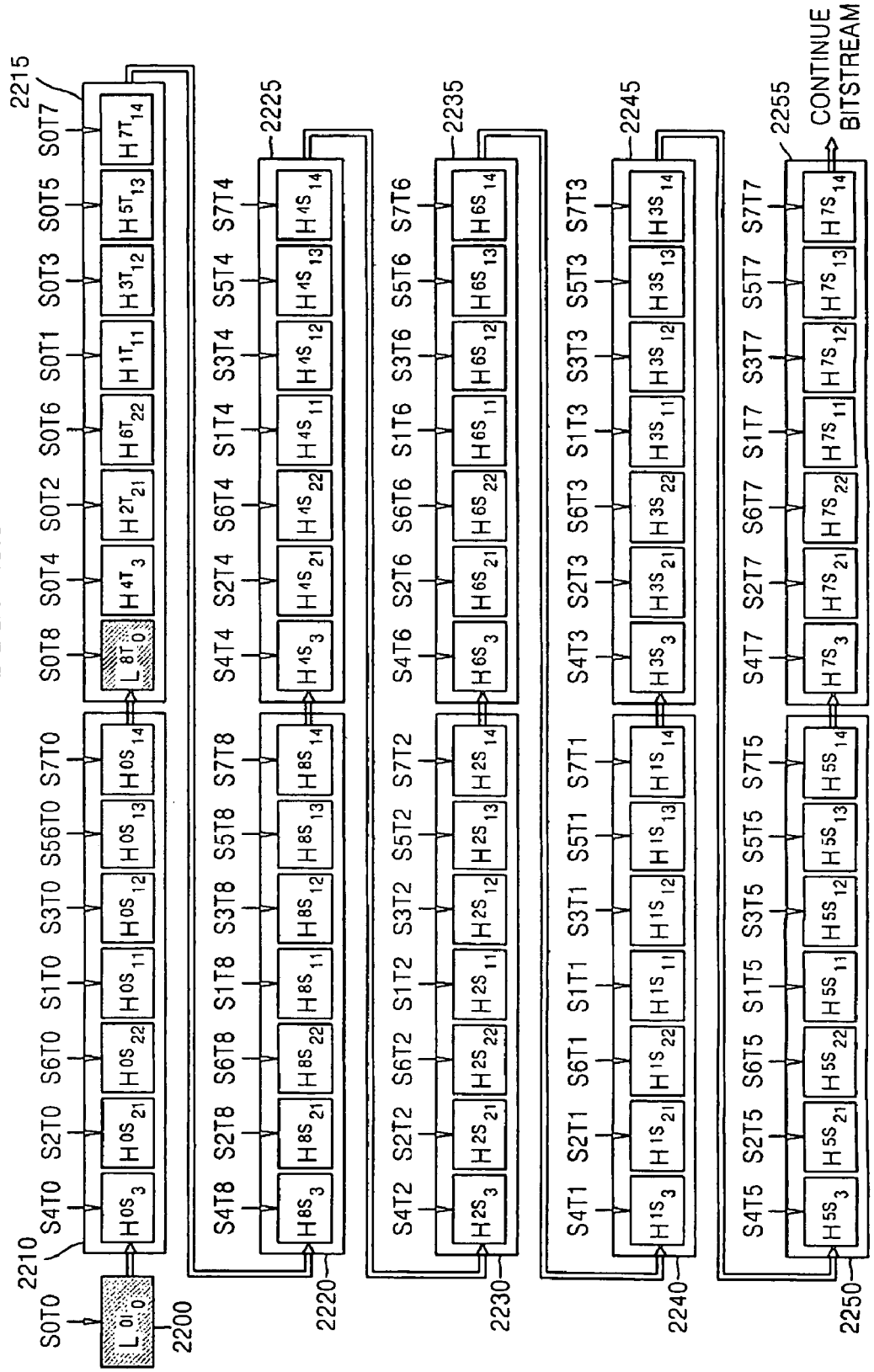
FIGS. 22 through 25 illustrate bitstreams generated in the scalable multi-view image encoding process according to an exemplary embodiment of the present invention.

FIG. 22 illustrates a full bitstream which includes information regarding all images in a 2D GOP and which is generated in the process of scalably encoding a multi-view image according to an exemplary embodiment of the present invention. Referring to FIGS. 21 and 22, a bitstream for $\{L^{OI}_0, H^{OS}_3, H^{OS}_{21}, H^{OS}_{22}, H^{OS}_{11}, H^{OS}_{12}, H^{OS}_{13}, H^{OS}_{14}\}$ 2200 and 2210 is a first 2D GOP in a spatial-axis direction, which is input from the eight cameras. A bitstream 2215 for temporal low-frequency and high-frequency images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ generated after the temporal filtering process is inserted after the first 2D GOP on the spatial-axis direction. Then, bitstreams 2220, 2225, 2230, 2240, 2245, 2250 and 2255 for spatial high-frequency images corresponding to the temporal low-frequency and high frequency images are sequentially inserted. Encoded spatial high-frequency images corresponding to temporal low-frequency images $L^{4S}_0, L^{2S}_0, L^{6S}_0, L^{1S}_0, L^{3S}_0, L^{5S}_0, L^{7S}_0$ are sequentially inserted into the bitstream.

Figure 23:
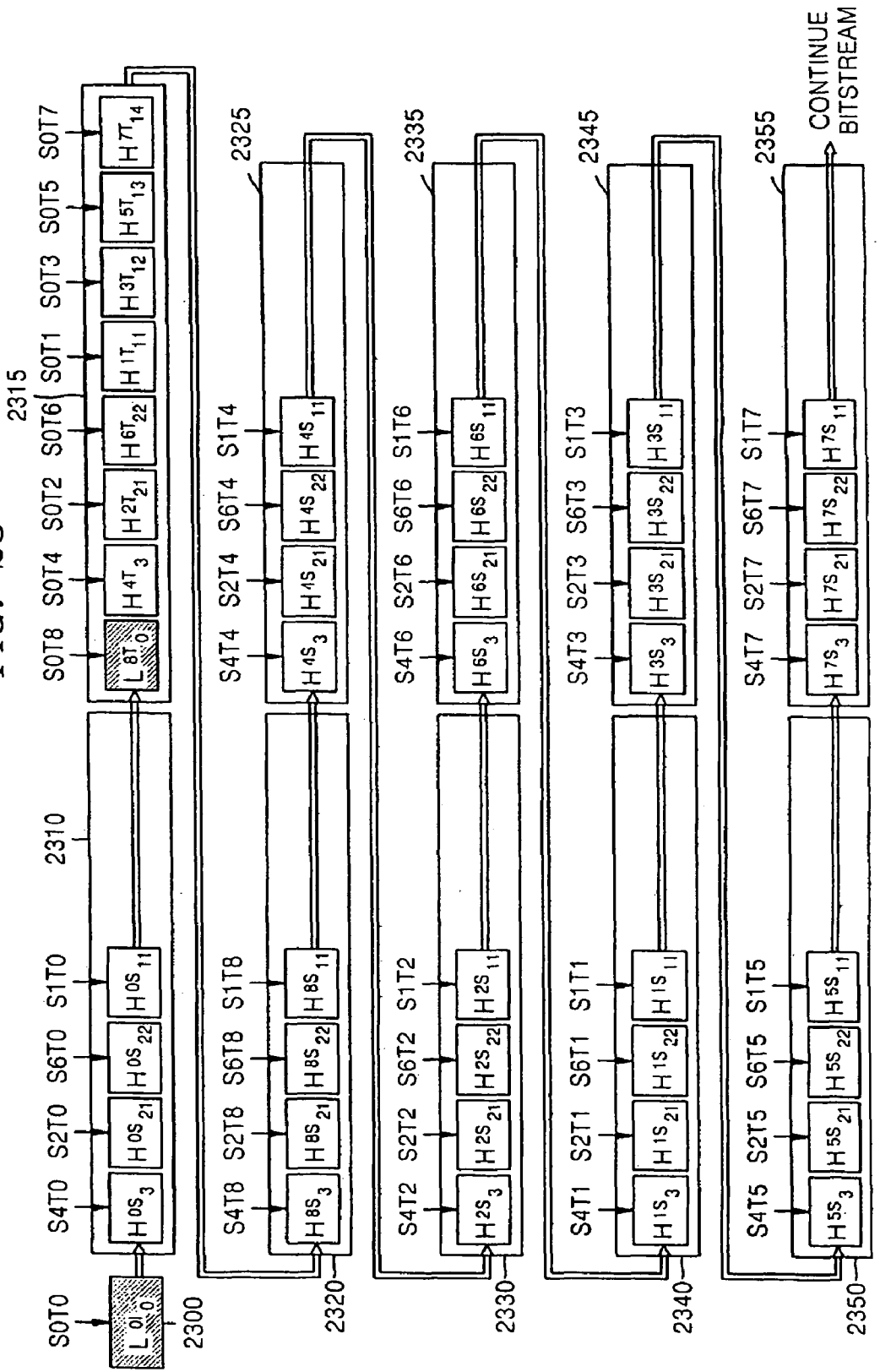

FIG. 23 illustrates a bitstream partially encoded in the spatial-axis direction in the process of scalably encoding a multi-view image according to an exemplary embodiment of the present invention. In FIG. 23, images input from the cameras S0, S1, S2, S4 and S6 illustrated in FIG. 21 are processed. Referring to FIGS. 21 and 23, an entire bitstream 2315 for all the temporal low-frequency and high-frequency images $\{L^{8T}_0, H^{4T}_3, H^{2T}_{12}, H^{6T}_{22}, H^{1T}_{11}, H^{3T}_{12}, H^{5T}_{13}, H^{7T}_{14}\}$ is inserted when the images input from the cameras S0, S1, S2 and S6 are encoded into a with the half spatial resolution. However, not all of the spatial high-frequency images are inserted. Instead, bitstreams 2320, 2325, 2330, 235, 2340, 2345, 2350 and 2355 for spatial high-frequency images corresponding to the images input from the cameras S0, S1, S2, S4 and S6 are inserted. Such a partial bitstream may be generated according to the spatial resolution required by the spatial image scalable encoding unit 1540 or may be extracted from a full bitstream and then reconfigured by the decoding end.

Figure 24:
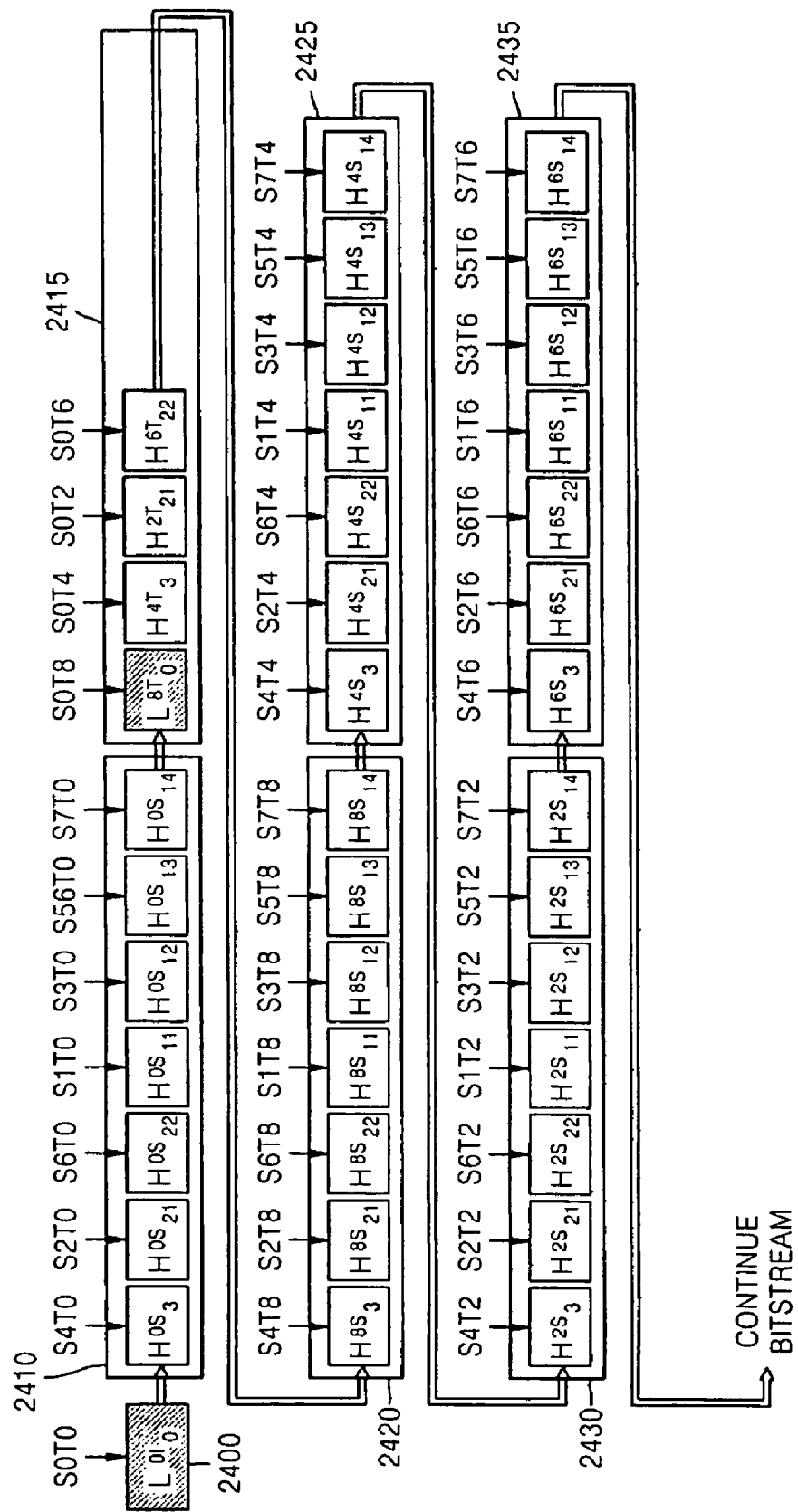

FIG. 24 illustrates a bitstream partially encoded in the temporal-axis direction in the process of scalably encoding a multi-view image according to an exemplary embodiment of the present invention. In FIG. 24, a bitstream is partially encoded at the half temporal resolution reduced from the full temporal resolution. Referring to FIGS. 21 and 24, a bitstream for temporal low-frequency and high-frequency images $\{L^{8T}_0, H^{4T}_3, H^{2T}_{21}, H^{6T}_{22}\}$ 2415 among the temporal low-frequency and high-frequency images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ generated after the temporal filtering process is inserted. In addition, bitstreams 2420, 2425, 2430 and 2435 for spatial high-frequency images corresponding to temporal low-frequency and high-frequency images are inserted.

Figure 25:
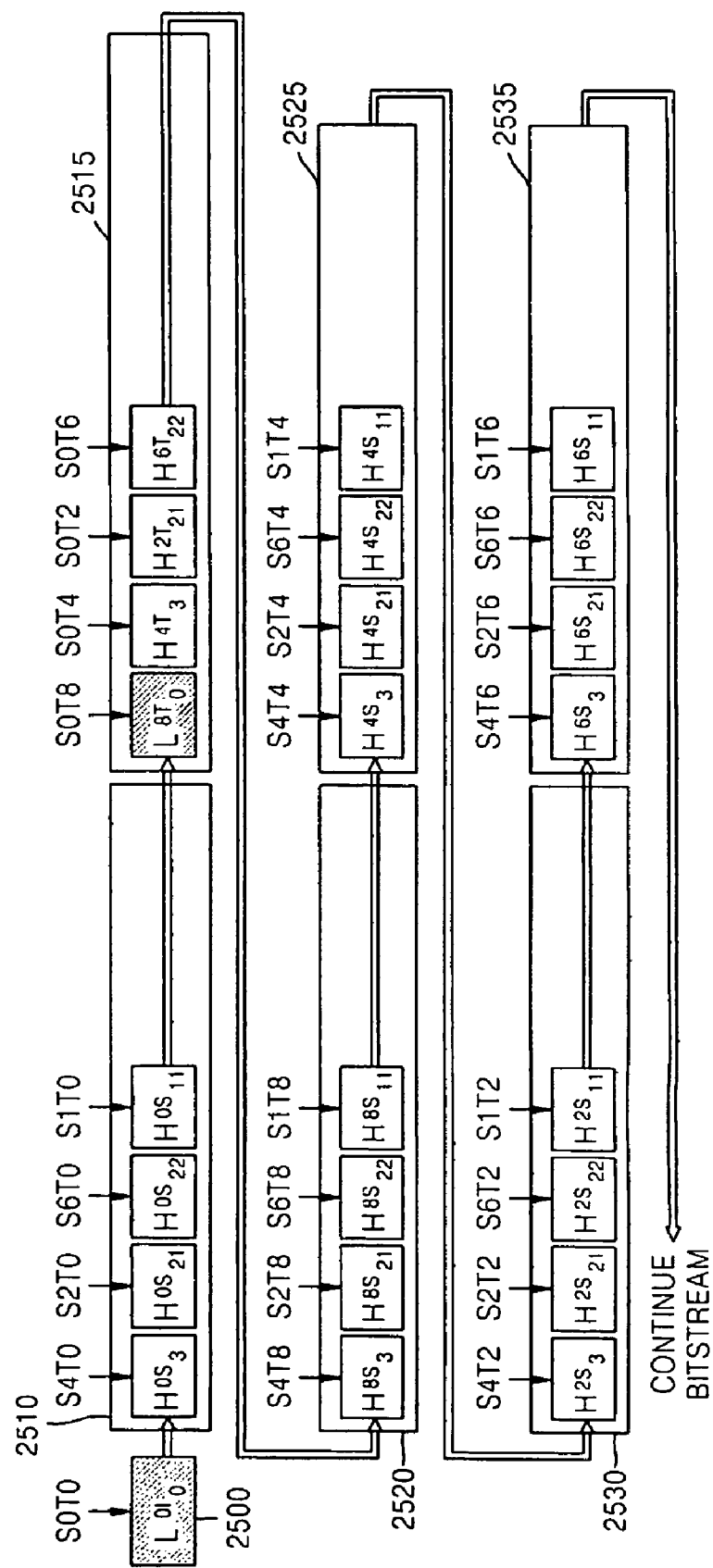

FIG. 25 illustrates a bitstream partially encoded in the temporal-axis and spatial-axis directions in the process of scalably encoding a multi-view image according to an exemplary embodiment of the present invention. FIG. 25 illustrates a case in which images input from the cameras S0, S1, S2, S4 and S6 are processed according to the half temporal resolution for partial bitstream encoding.

As described above, when the scalable multi-view encoding method is used according to an exemplary embodiment of the present invention, spatio-temporal resolutions can be scaled in the temporal- and spatial-axis directions. The range of resolution is inversely proportional to the size of a group of M×N 2D images ($M=2^m$ and $N=2^n$). In other words, an exemplary embodiment of the present invention can provide a spatial resolution of up to 1/M and a temporal resolution of up to 1/N.

A scalable multi-view image decoding method and apparatus according to an exemplary embodiment of the present invention will now be described.

Figure 26:
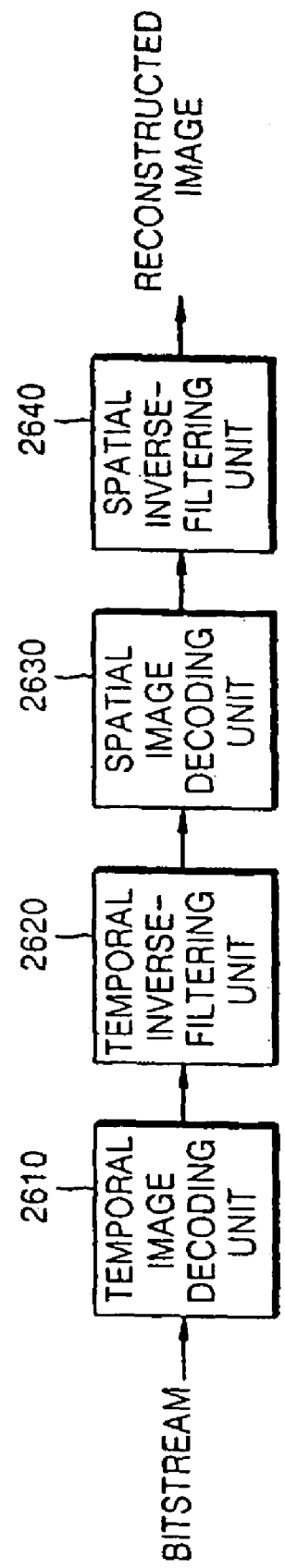
FIG. 26 is a block diagram of a scalable multi-view image decoding apparatus according to an exemplary embodiment of the present invention.
Figure 27:
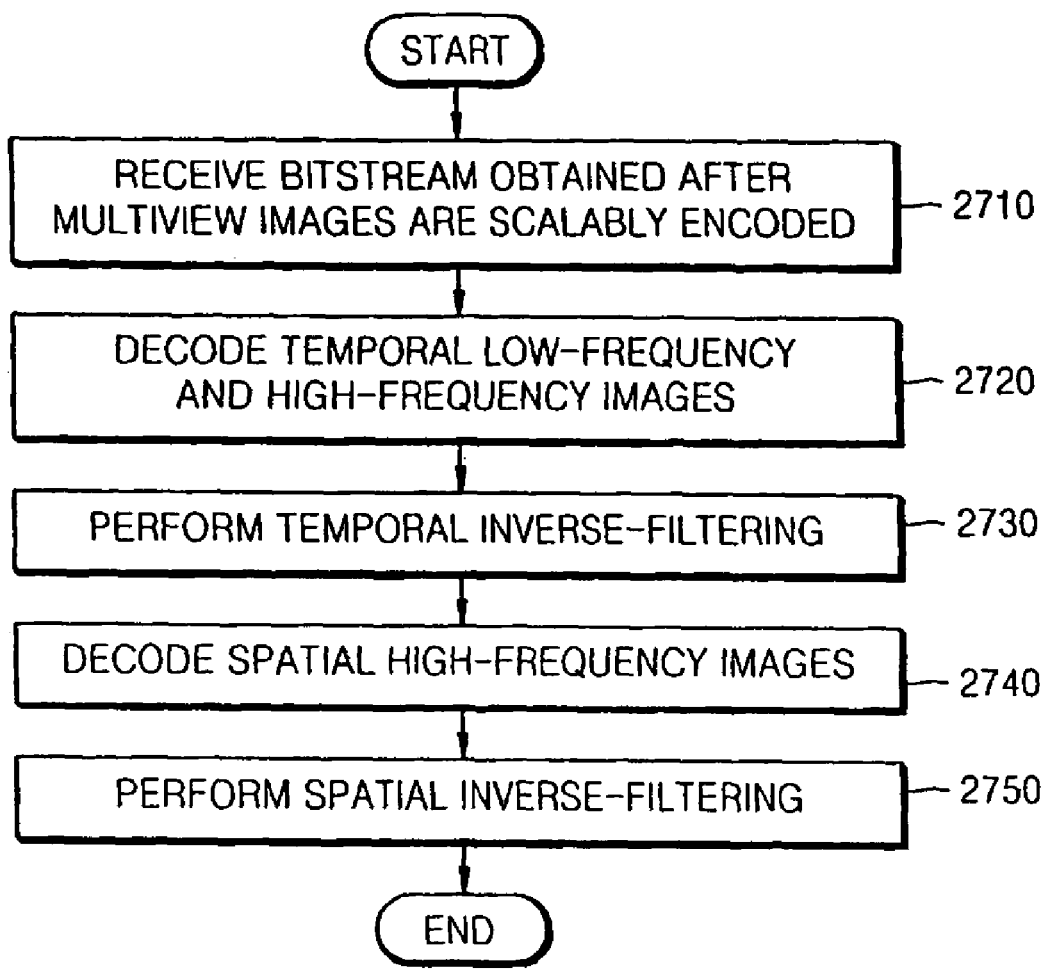
FIG. 27 is a flowchart illustrating a scalable multi-view image decoding method according to an exemplary embodiment of the present invention.

FIG. 26 is a block diagram of a scalable multi-view image decoding apparatus according to an exemplary embodiment of the present invention. FIG. 27 is a flowchart illustrating a scalable multi-view image decoding method according to an exemplary embodiment of the present invention.

Referring to FIG. 26, the apparatus includes a temporal image decoding unit 2610, a temporal inverse-filtering unit 2620, a spatial image decoding unit 2630, and a spatial inverse-filtering unit 2640.

The temporal image decoding unit 2610 receives a bitstream encoded according to the scalable multi-view image encoding method described above (operation 2710). Then, the temporal image decoding unit 2710 decodes the received bitstream and generates temporal low-frequency and high-frequency images from the bitstream (operation 2720). In this decoding operation, an inverse discrete cosine transform, texture information, and motion information are generated as in a conventional image decoding operation.

The temporal inverse-filtering unit 2620 inversely filters, that is, performs a composition operation on, the decoded temporal low-frequency and high-frequency images using the MCTF or the hierarchical B-pictures and reconstructs corresponding spatial low-frequency images on the spatial axis (operation 2730).

The spatial image decoding unit 2630 decodes spatial high-frequency images included in the bitstream according to required temporal and spatial resolutions (operation 2740).

The spatial inverse-filtering unit 2640 inversely filters the spatial low-frequency images reconstructed by the temporal inverse-filtering unit 2620 and the spatial high-frequency images decoded by the spatial image decoding unit 2630 using the MCTF or the hierarchical B-pictures and reconstructs images on the spatial axis (operation 2750).

Figure 28:
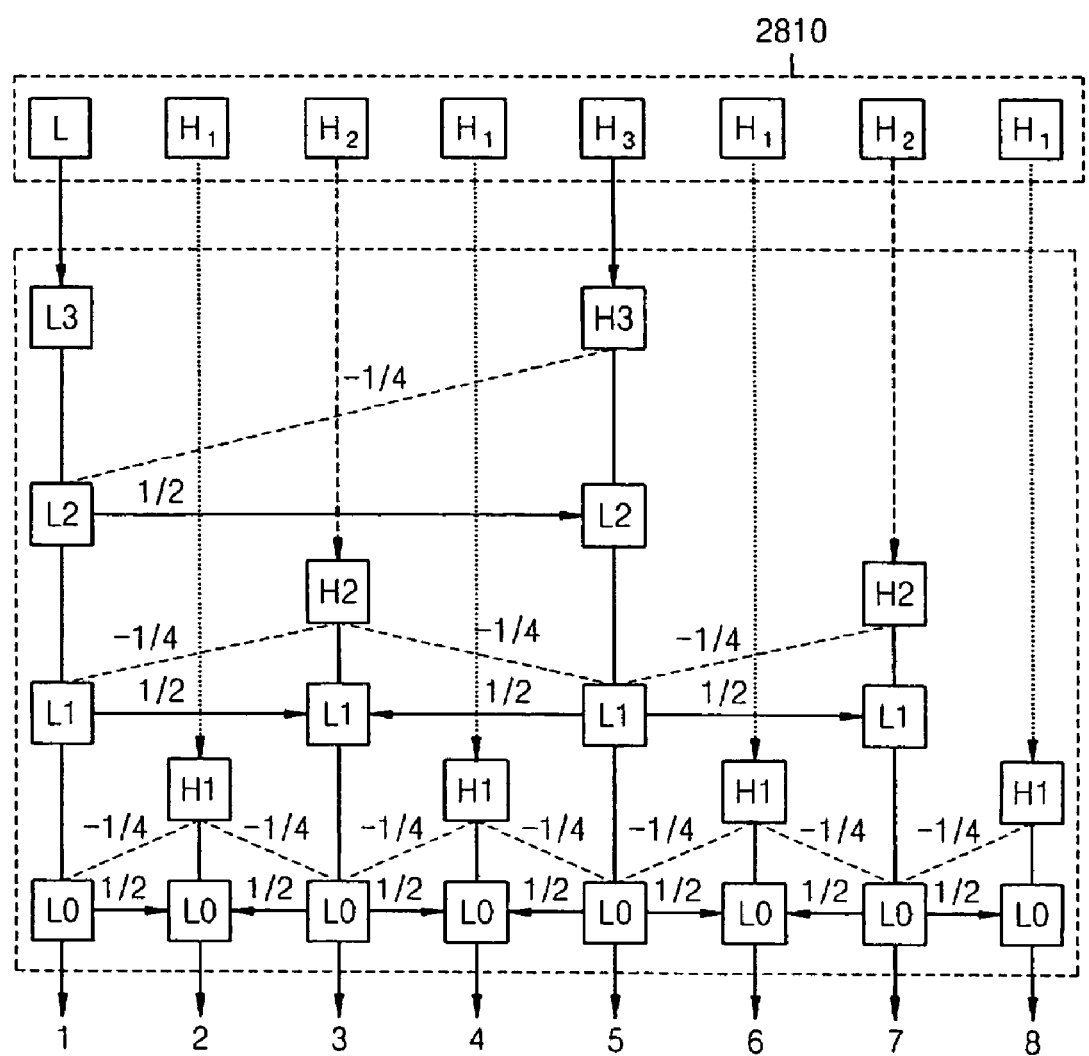
FIG. 28 illustrates an inverse filtering operation included in the scalable multi-view image decoding method of FIG. 27

FIG. 28 illustrates an inverse filtering operation included in the scalable multi-view image decoding method of FIG. 27. As described above, the temporal inverse-filtering unit 2620 and the spatial inverse-filtering unit 2640 illustrated in FIG. 26 inversely filtered images temporally filtered and images spatially filtered, while the images are included in each bitstream. In this inverse filtering operation, a low-frequency image L3 of the base layer is generated. Then, a low-frequency image L2 in a next layer is generated using a high-frequency image H3 of a first enhancement layer and the generated low-frequency image L3. Also, a low-frequency image L1 in a next layer is generated using a high-frequency image H2 of a second enhancement layer and the generated low-frequency image L2, and an original image L0 is reconstructed using a high frequency image H1 of a third enhancement layer and the generated low-frequency image L1 before the original image L0 is filtered. In this inverse filtering operation, the temporal inverse-filtering unit 2620 and the spatial inverse-filtering unit 240 reconstruct an original image before being decomposed through the MCTF. Since the inverse filtering operation is identical to a conventional MCTF operation, a detailed description thereof will not be repeated.

A method of decoding a bitstream generated using the scalable multi-view image encoding method according to an exemplary embodiment of the present invention will now be described with reference to FIGS. 22 through 25.

Referring back to FIGS. 21 and 22, the bitstream for $\{L^{OI}_0, H^{OS}_3, H^{OS}_{21}, H^{OS}_{22}, H^{OS}_{11}, H^{OS}_{12}, H^{OS}_{13}, H^{OS}_{14}\}$ 2200 and 2210 is the first group of images in the spatial-axis direction, which are input from the eight cameras. The bitstream for $\{L^{OI}_0, H^{OS}_3, H^{OS}_{21}, H^{OS}_{22}, H^{OS}_{11}, H^{OS}_{12}, H^{OS}_{13}, H^{OS}_{14}\}$ 2200 and 2210 are decoded in the spatial-axis direction to generate the low-frequency image $L^{OI}_0$ and the high-frequency images $(H^{OS}_3, H^{OS}_{21}, H^{OS}_{22}, H^{OS}_{11}, H^{OS}_{12}, H^{OS}_{13}, H^{OS}_{14})$, which are, after the MCTF composition operation, reconstructed into eight images corresponding to the first frame images in the spatial-axis direction. After the bitstream for the first group of images on the spatial axis is decoded, the image decoding operation is performed on each 2D GOP. First, the bitstream 2215 for the temporal low-frequency and high-frequency images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ is decoded in the temporal-axis direction to generate the low-frequency image $L^{8T}_0$ and the high-frequency images $H^{4T}_3, H^{2T}_{21}, H^{6T}_{22}, H^{1T}_{11}, H^{3T}_{12}, H^{5T}_{13}, H^{7T}_{14}$, which are, after the MCTF composition operation, reconstructed into 8 images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ on the temporal axis corresponding to the group of 8×8 images. The reconstructed high-frequency images $H^{4T}_3, H^{2T}_{21}, H^{6T}_{22}, H^{1T}_{11}, H^{3T}_{12}, H^{5T}_{13}, H^{7T}_{14}$ correspond to the low-frequency images in an $n^{th}$ ($H^{iT}$) group of images on the spatial axis. In other words, the reconstructed high-frequency images $H^{4T}_3, H^{2T}_{21}, H^{6T}_{22}, H^{1T}_{11}, H^{3T}_{12}, H^{5T}_{13}, H^{7T}_{14}$ correspond to the low-frequency images $L^{4S}_0, L^{2S}_0, L^{6S}_0, L^{1S}_0, L^{3S}_0, L^{5S}_0, L^{7S}_0$. In addition, a group of spatial high-frequency images are decoded using the low-frequency image $L^{8T}_0$ on the temporal axis and the reconstructed high-frequency images $H^{4T}_3, H^{2T}_{21}, H^{6T}_{22}, H^{1T}_{11}, H^{3T}_{12}, H^{5T}_{13}, H^{7T}_{14}$. A bitstream for an $i^{th}$ group of high-frequency images on the spatial axis is decoded by repeating the following operation.

Array [8]={8, 4, 2, 6, 1, 3, 5, 7}
For (index=0; I<8; index++) {
i=Array [index];
The bitstream for $\{H^{iS}_{11}, H^{iS}_{21}, H^{iS}_{12}, H^{iS}_3, H^{iS}_{13}, H^{iS}_{22}, H^{iS}_{14}\}$ is decoded, and the MCTF composition operation is performed on the decoded bitstream and the corresponding low-frequency image $L^{iS}_0$. Consequently, the $i^{th}$ group of images on the spatial axis is reconstructed.}

The above operation is repeated on the entire image sequence for each 2D GOP.

Referring back to FIGS. 21 and 23, when the bitstream including information regarding images on the spatial axis in a 2D GOP, which are input from the cameras S0, S1, S2, S4, and S6, is decoded using spatial partial decoding, the bitstream for $\{L^{OI}_0, H^{OS}_3, H^{OS}_{21}, H^{OS}_{22}, H^{OS}_{11}, H^{OS}_{12}, H^{OS}_{13}, H^{OS}_{14}\}$ 2300 and 2310, which is the first group of images in the spatial-axis direction and is input from the cameras S0, S1, S2, S4 and S6, is decoded to generate the low-frequency image $L^{OI}_0$ and the high-frequency images $H^{OS}_3, H^{OS}_{21}, H^{OS}_{22}, H^{OS}_{11}$, which are, after the MCFTF composition operation, reconstructed into five images corresponding to the first frame images in the spatial-axis direction.

After the bitstream for the first group of images on the spatial axis is decoded, the bitstream 2215 for the temporal low-frequency and high-frequency images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ is decoded on the temporal-axis to generate the low-frequency image $L^{8T}_0$ and the high-frequency images $H^{4T}_3, H^{2T}_{21}, H^{6T}_{22}, H^{1T}_{11}, H^{3T}_{12}, H^{5T}_{13}, H^{7T}_{14}$ in the temporal-axis direction, which are, after the MCTF composition operation, reconstructed into eight images $\{L^{8T}_0, H^{4T}_3, H^{2T}_{21}, H^{6T}_{22}, H^{1T}_{11}, H^{3T}_{12}, H^{5T}_{13}, H^{7T}_{14}\}$ on the temporal axis in the group of 8×8 images. When spatial partial decoding is performed, all images in the temporal-axis direction must be decoded. Therefore, an encoded bitstream includes all of the temporal low-frequency and high-frequency images filtered in the temporal-axis direction. The images input from the cameras S0, S1, S2, S4, and S6 are reconstructed after the decoding and MCTF composition operations are performed on the spatial high-frequency images 2320, 2325, 2330, 2335, 2340, 2350 and 2355 sequentially.

Referring back to FIGS. 21 and 24, when a bitstream which may have the half temporal resolution reduced from the full temporal resolution and which is for images on the temporal-axis in a 2D GOP is decoded using partial temporal decoding, the bitstream for the temporal low-frequency and high-frequency images $\{L^{8T}_0, H^{4T}_3, H^{2T}_{21}, H^{6T}_{22}\}$ 2415 among the 8 images on the temporal axis in the group of 8×8 2D images is decoded and MCTF-inverse filtered. Consequently, the spatial low-frequency images $\{L^{8T}_0, H^{4T}_3, H^{2T}_{21}, H^{6T}_{22}\}$ in the temporal-axis direction are reconstructed. The encoded bitstreams 2420, 2425, 2430 and 2435 for the spatial high-frequency images corresponding to the reconstructed spatial low-frequency images are reconstructed through the decoding and MCTF inverse filtering operations.

Referring back to FIGS. 21 and 25, a bitstream for temporal low-frequency and high-frequency images $\{L^{8T}_0, H^{4T}_3, H^{2T}_{21}, H^{6T}_{22}\}$ 2515 among the eight images on the temporal axis in a group of 8×8 2D images is decoded and MCTF-inverse filtered. The bitstream is filtered when the resolution of data distributed over a temporal domain on the temporal axis in a 2D GOP is reduced from the full temporal resolution to the half temporal resolution using partial temporal decoding and when the bitstream for images in a spatial domain on the spatial axis, which are input from the cameras S0, S1, S2, S4 and S6, are processed using spatial partial decoding. Consequently, the spatial low-frequency images $\{L^{8T}_0, H^{4T}_3, H^{2T}_{21}, H^{6T}_{22}\}$ in the temporal-axis direction are reconstructed. The spatial high-frequency images 2520, 2525, 2530 and 2535 obtained after the images input from the cameras S0, S1, S2, S4, S6 are spatially filtered are reconstructed through the decoding and MCTF composition operations.

The scalable multi-view image encoding and decoding methods and apparatuses according to an exemplary embodiment of the present invention can implement scalability using a hierarchical structure in which a 2D GOP is designated as a base layer as in an SVC codec structure and using an FCS method. The methods and apparatuses can provide temporal scalability, view (camera) spatial scalability, size-dependent spatial scalability, and SNR scalability.

Figure 29:
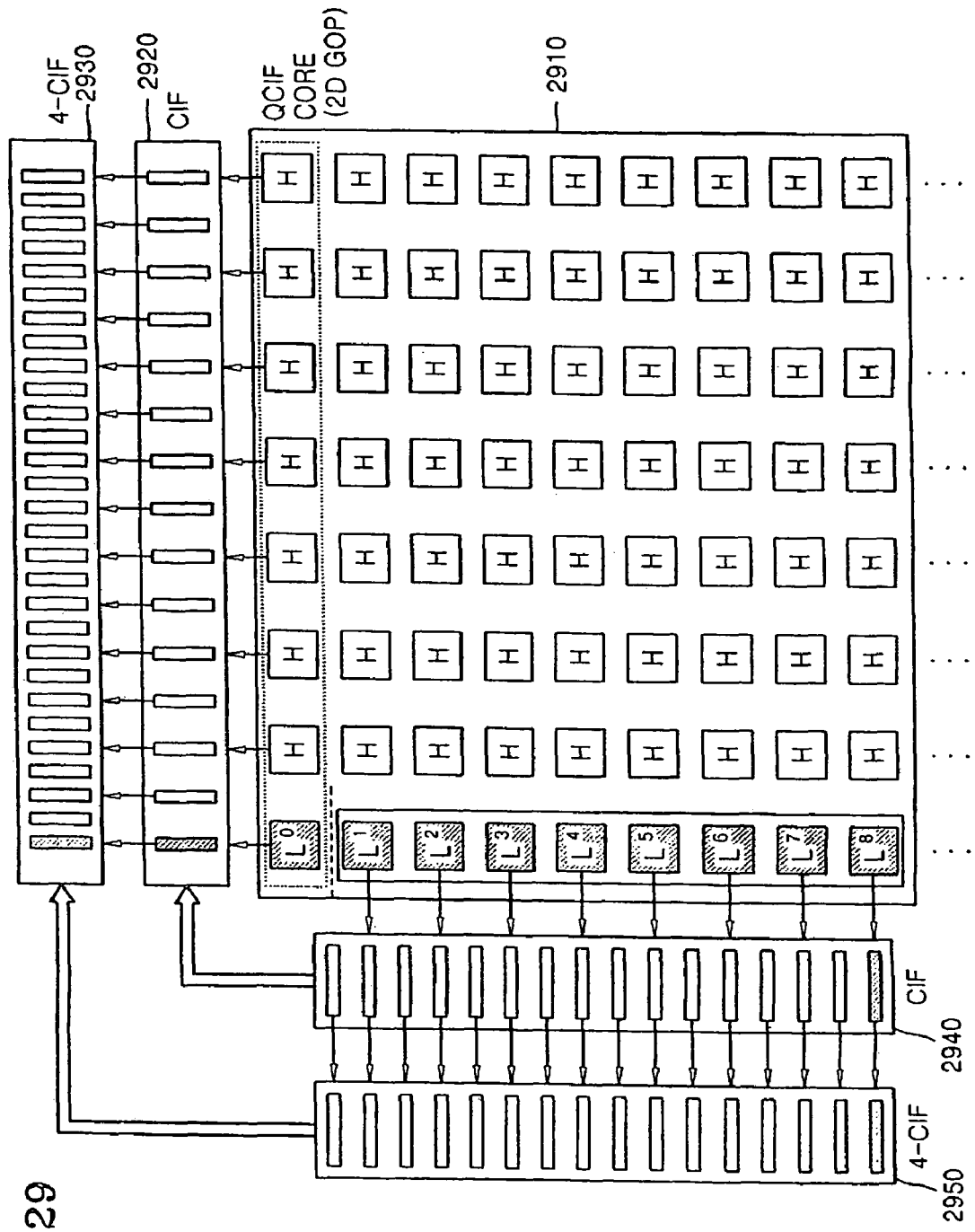
FIG. 29 is a conceptual diagram of a scalable multi-view image encoding apparatus to provide spatial scalability with various sizes of an image according to an exemplary embodiment of the present invention.

FIG. 29 is a conceptual diagram of a scalable multi-view image encoding apparatus to provide spatial scalability with various sizes of an image according to an exemplary embodiment of the present invention.

Temporal scalability and spatial scalability for selecting images input from selected cameras can be implemented using partial temporal decoding and partial spatial decoding described above. Temporal scalability according to the size of an image uses a hierarchical method used in a conventional scalable image coding method and can be provided using a 2D decimation filter, a 2D up-sampling filter and spatial information regarding a 2D GOP base layer. In this case, spatial scalability can be scaled to QCIF, CIF, and 4CIF according to the size of an image to be provided.

SNR scalability can be implemented using a bit-plane coding method that uses the block-based FGS method used in the conventional SVC. In this case, an FGS-enhanced bitstream is cut at a certain point and attached onto a base layer to provide an image of an enhancement layer.

Figure 30:
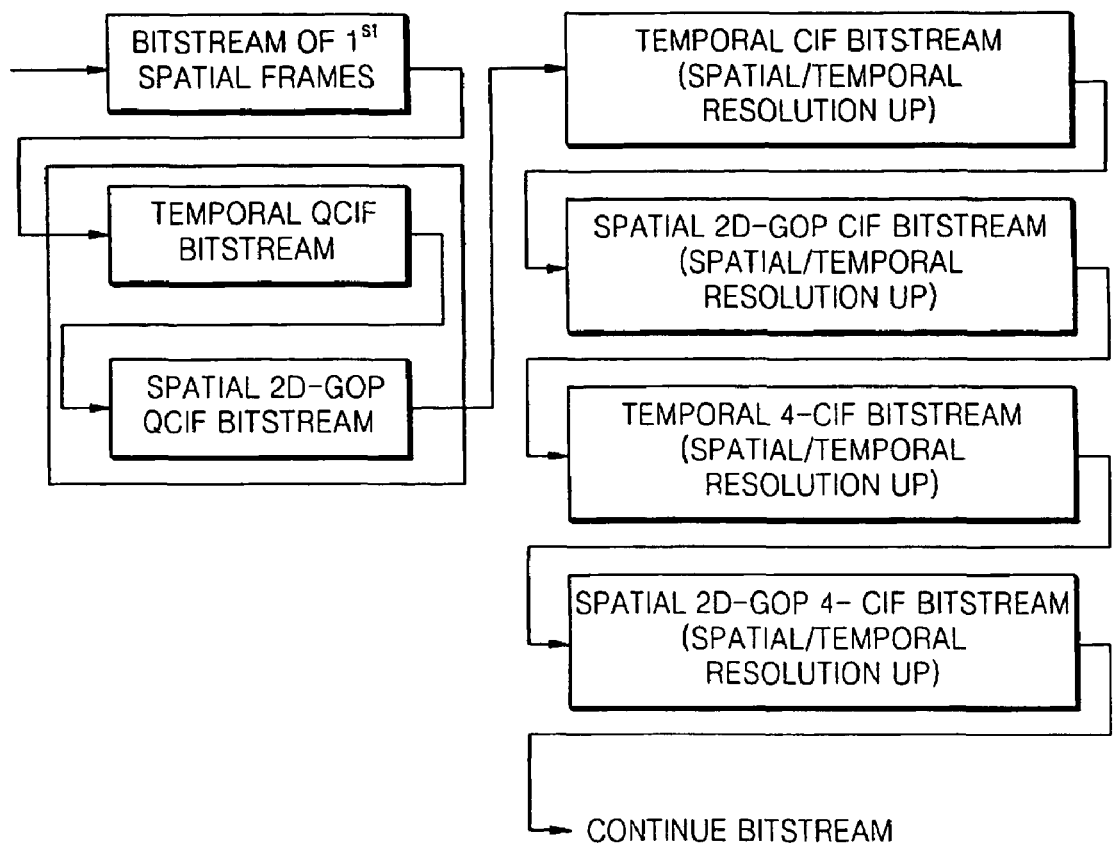
FIG. 30 illustrates the configuration of an entire bitstream including QCIF (Quarter Common Intermediate Format)-based 2D QCIF core, CIF (Common Intermediate Format) and 4-CIF bitstreams in a hierarchical structure according to an exemplary embodiment of the present invention.

FIG. 30 illustrates the configuration of an entire bitstream including QCIF-based 2D QCIF core, CIF and 4-CIF bitstreams in a hierarchical structure according to an exemplary embodiment of the present invention. Scalabilities provided in the exemplary embodiments of the present invention can be combined. Referring to FIG. 30, a bitstream for first frame images input from a QICF-based multi-view camera is followed by a bitstream for temporal images corresponding to a core bitstream in a 2D GOP and a bitstream for spatial QCIF in the 2D GOP. Then, a bitstream for CIF-based 2D-GOP and a bitstream for CIP-based 2D GOP are followed.

As described above, an exemplary embodiment of the present invention spatially and temporally filters a group of multi-view images and codes the filtered group of multi-view images using the correlation between temporally adjacent images, thereby enhancing coding efficiency. Also, an exemplary embodiment of the present invention can provide temporal scalability, view (camera) spatial scalability, size-dependent spatial scalability, and SNR scalability.

An exemplary embodiment of the present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion.

While the present invention has been particularly shown and described with reference to certain exemplary embodiments thereof, it will be understood by those of ordinary skill in the art that various changes in form and details may be made therein without departing from the spirit and scope of the present invention as defined by the appended claims and their equivalents.

What is claimed is:

1. A scalable multi-view image encoding method comprising:
   filtering M images on a spatial axis, which are input from M cameras, using at least one of spatial motion compensated temporal filtering (MCTF) and hierarchical B-pictures and generating a spatial low-frequency image and (M−1) spatial high-frequency images;
   filtering N spatial low-frequency images generated for an N period of time using at least one of temporal MCTF and the hierarchical B-pictures and generating a temporal low-frequency image and (N−1) temporal high-frequency images;
   scalably encoding the temporal low-frequency image and the (N−1) temporal high-frequency images according to a transmission bit rate allocated to each group of M×N two-dimensional (2D) images; and
   scalably encoding the (M−1) spatial high-frequency images according to a transmission bit rate allocated to the temporal low-frequency image and the (N−1) temporal high-frequency images;
   wherein M is an integer equal to spatial image inputs and N is an integer equal to temporal image frames.

2. The encoding method of claim 1, wherein the spatial MCTF comprises a closed loop structure in which the M images input from the M cameras are used.

3. The encoding method of claim 1, wherein the temporal MCTF comprises an open structure in which the temporal low-frequency image generated after the temporal MCTF is performed on a previously processed group of M×N 2D images is used.

4. The encoding method of claim 1, wherein the scalable encoding of the temporal low-frequency image and the (N−1) temporal high-frequency images comprises:
   selecting a temporal high-frequency image to be encoded from the (N−1) temporal high-frequency images according to the allocated transmission bit rate and a temporal resolution; and
   scalably encoding the generated temporal low-frequency image and the selected temporal high-frequency image.

5. The encoding method of claim 1, wherein the scalable encoding of the (M−1) spatial high-frequency images comprises:

selecting a spatial high-frequency image to be encoded according to the transmission bit rate allocated to the temporal low-frequency image and the (N−1) temporal high-frequency images from the (M−1) spatial high-frequency images simultaneously input from the M cameras; and scalably encoding the selected spatial high-frequency image.

6. A scalable multi-view image encoding apparatus comprising:

a spatial image filtering unit for filtering M images on a spatial axis, which are input from M cameras, using at least one of spatial MCTF and hierarchical B-pictures and for generating a spatial low-frequency image and (M−1) spatial high-frequency images;

a temporal image filtering unit for filtering N spatial low-frequency images generated for an N period of time using at least one of temporal MCTF and the hierarchical B-pictures and for generating a temporal low-frequency image and (N−1) temporal high-frequency images;

a temporal image scalable encoding unit for scalably encoding the temporal low-frequency image and the (N−1) temporal high-frequency images according to a transmission bit rate allocated to each group of M×N two-dimensional (2D) images; and a spatial image scalable encoding unit for scalably encoding the (M−1) spatial high-frequency images according to a transmission bit rate allocated to the temporal low-frequency image and the (N−1) temporal high-frequency images;

wherein M is an integer equal to spatial image inputs and N is an integer equal to temporal image frames.

7. The encoding apparatus of claim 6, wherein the spatial image filtering unit comprises a closed loop structure in which the M images input from the M cameras are used.

8. The encoding apparatus of claim 6, wherein the temporal image filtering unit comprises an open structure in which the temporal low-frequency image generated after the temporal MCTF is performed on a previously processed group of M×N 2D images is used.

9. The encoding apparatus of claim 6, wherein the temporal image scalable encoding unit selects a temporal high-frequency image to be encoded from the (N−1) temporal high-frequency images according to the allocated transmission bit rate and a temporal resolution and scalably encodes the generated temporal low-frequency image and the selected temporal high-frequency image.

10. The encoding apparatus of claim 6, wherein the spatial image scalable encoding unit selects a spatial high-frequency image to be encoded according to the transmission bit rate allocated to the temporal low-frequency image and the (N−1) temporal high-frequency images from the (M−1) spatial high-frequency images simultaneously input from the M cameras and scalably encodes the selected spatial high-frequency image.

11. A scalable multi-view image decoding method comprising:

receiving a scalably encoded bitstream corresponding to spatio-temporal low-frequency and high-frequency images generated after a group of two-dimensional (2D) images input from M cameras for an N period of time are spatially and temporally filtered using at least one of motion compensated temporal filtering (MCTF) and hierarchical B-pictures;

decoding the scalably encoded temporal low-frequency and high-frequency images comprised in the bitstream;

inversely filtering the decoded temporal low-frequency and high-frequency images using at least one of temporal inverse-MCTF and the hierarchical B-pictures and reconstructing the spatial low-frequency images;

decoding the scalably encoded spatial high-frequency images comprised in the bitstream; and inversely filtering the reconstructed spatial low-frequency images and the decoded spatial high-frequency images using at least one of the temporal inverse-MCTF and hierarchical M-pictures and reconstructing images;

wherein M is an integer equal to spatial image inputs and N is an integer equal to temporal image frames.

12. The decoding method of claim 11, wherein the scalably encoded bitstream is generated by:

filtering M images on a spatial axis, which are input from the M cameras, using at least one of spatial MCTF and the hierarchical B-pictures and generating a spatial low-frequency image and (M−1) spatial high-frequency images;

filtering N spatial low-frequency images generated for the N period of time using at least one of temporal MCTF and the hierarchical B-pictures and generating a temporal low-frequency image and (N−1) temporal high-frequency images;

scalably encoding the temporal low-frequency image and the (N−1) temporal high-frequency images according to a transmission bit rate allocated to each group of M×N 2D images; and scalably encoding the (M−1) spatial high-frequency images according to a transmission bit rate allocated to the temporal low-frequency image and the (N−1) temporal high-frequency images.

13. A scalable multi-view image decoding apparatus comprising:

a temporal image decoding unit for receiving a scalably encoded bitstream corresponding to spatio-temporal low-frequency and high-frequency images generated after a group of two-dimensional (2) images input from M cameras for an N period of time are temporally and spatially filtered using at least one of motion compensated temporal filtering (MCTF) and hierarchical B-pictures, and decoding the scalably encoded temporal low-frequency and high-frequency images comprised in the bitstream;

a temporal inverse-filtering unit for inversely filtering the decoded temporal low-frequency and high-frequency images using at least one of temporal inverse-MCTF and the hierarchical B-pictures and reconstructing the spatial low-frequency images;

a spatial image decoding unit for decoding the scalably encoded spatial high-frequency images comprised in the bitstream; and a spatial inverse-filtering unit for inversely filtering the reconstructed spatial low-frequency images and the decoded spatial high-frequency images using at least one of the temporal inverse-MCTF and hierarchical M-pictures and reconstructing images;

wherein M is an integer equal to spatial image inputs and N is an integer equal to temporal image frames.

14. The decoding apparatus of claim 13, wherein the scalably encoded bitstream generated by:
　filtering M images on a spatial axis, which are input from the M cameras, using at least one of spatial MCTF and the hierarchical B-pictures and generating a spatial low-frequency image and (M−1) spatial high-frequency images;
　filtering N spatial low-frequency images generated for an N period of time using at least one of temporal MCTF and the hierarchical B-pictures and generating a temporal low-frequency image and (N−1) temporal high-frequency images;
　scalably encoding the temporal low-frequency image and the (N−1) temporal high-frequency images according to a transmission bit rate allocated to each group of M×N 2D images; and
　scalably encoding the (M−1) spatial high-frequency images according to a transmission bit rate allocated to the temporal low-frequency image and the (N−1) temporal high-frequency images.

* * * * *